C. F. LOGAN.
FIBER TREATING MACHINE.
APPLICATION FILED DEC. 4, 1914.
1,238,310.
Patented Aug. 28, 1917.
15 SHEETS—SHEET 1.
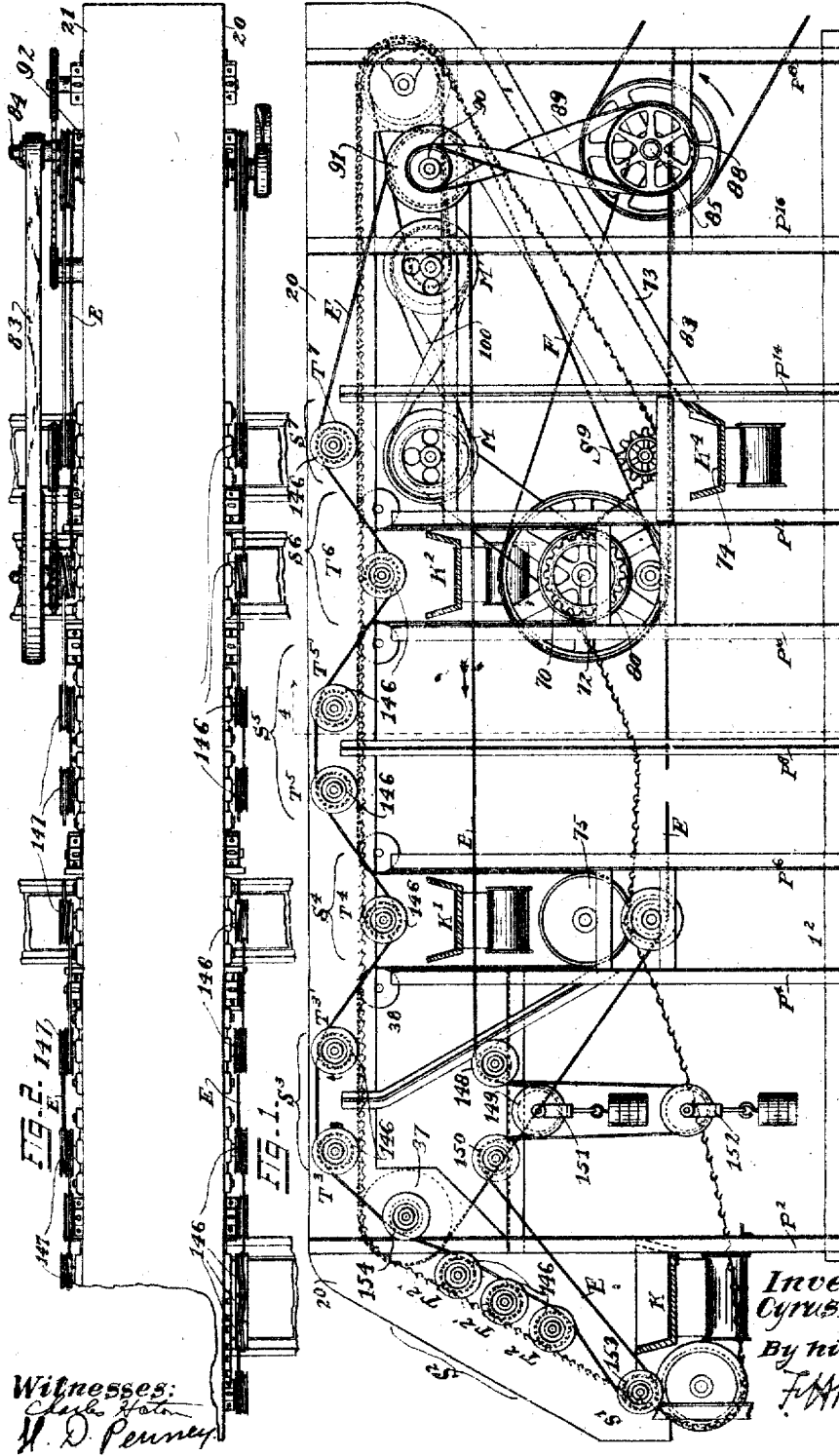

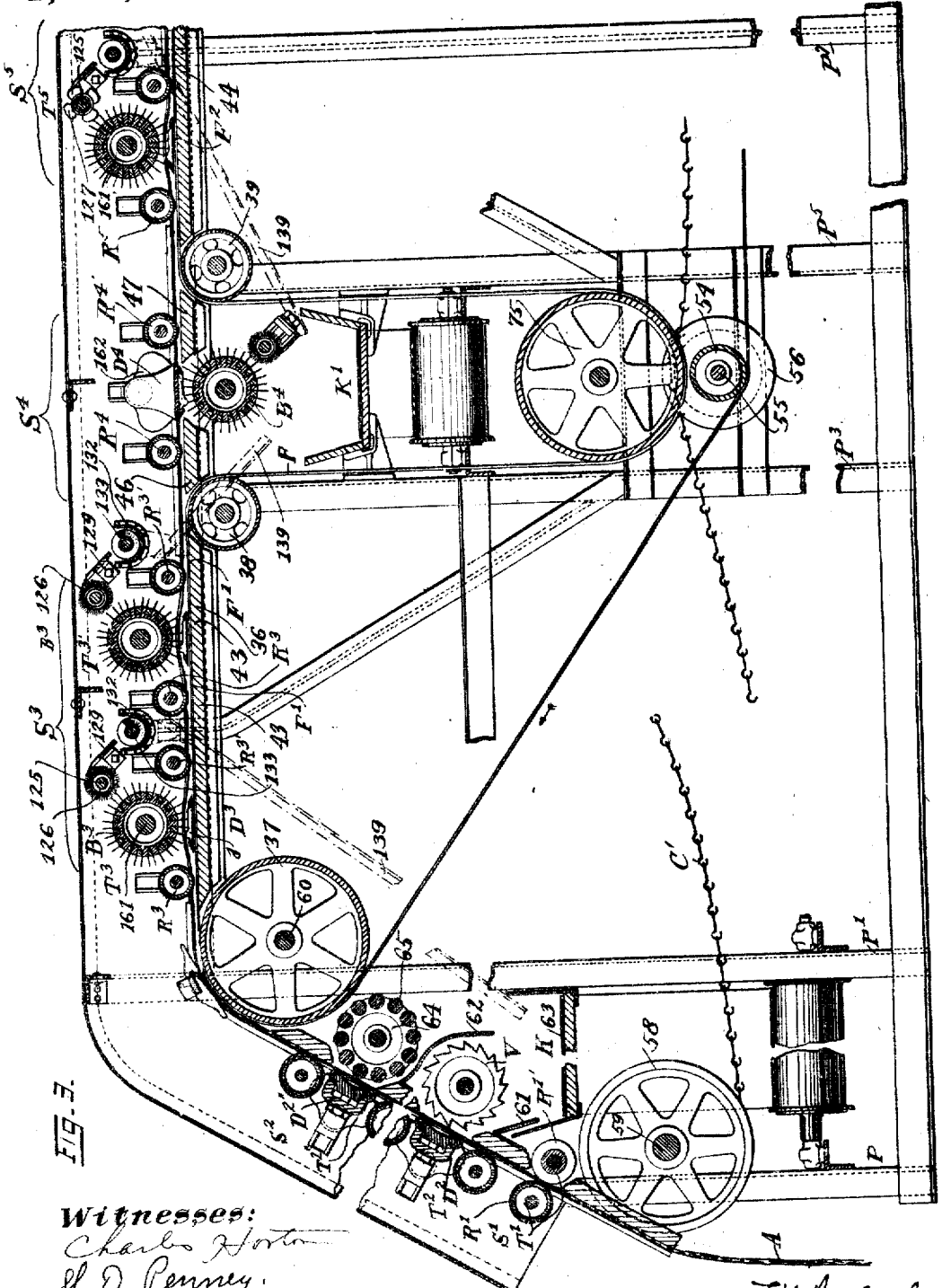

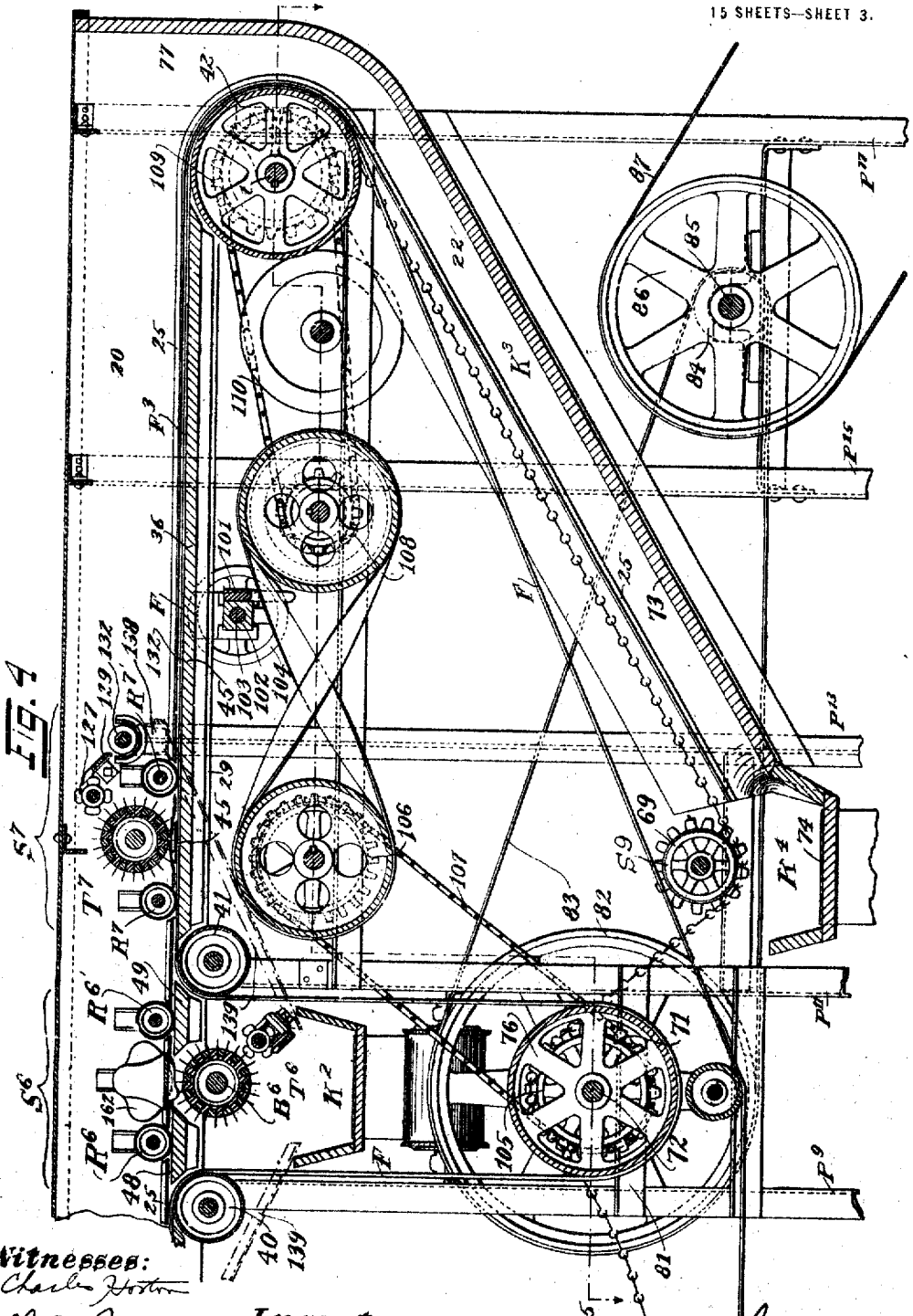

C. F. LOGAN.
FIBER TREATING MACHINE.
APPLICATION FILED DEC. 4, 1914.
1,238,310.
Patented Aug. 28, 1917.
15 SHEETS—SHEET 4.
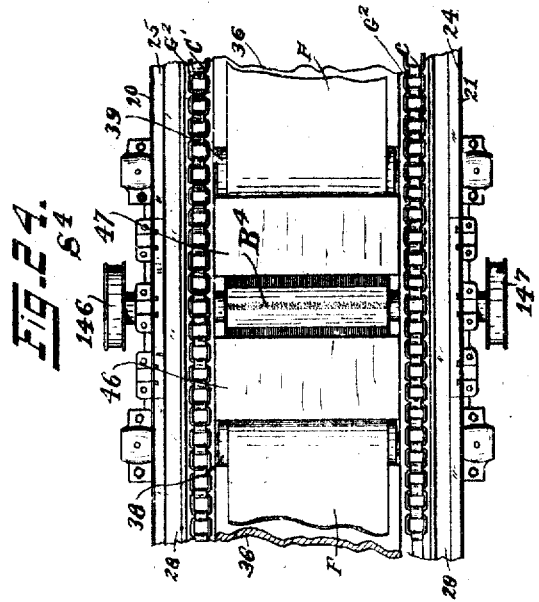
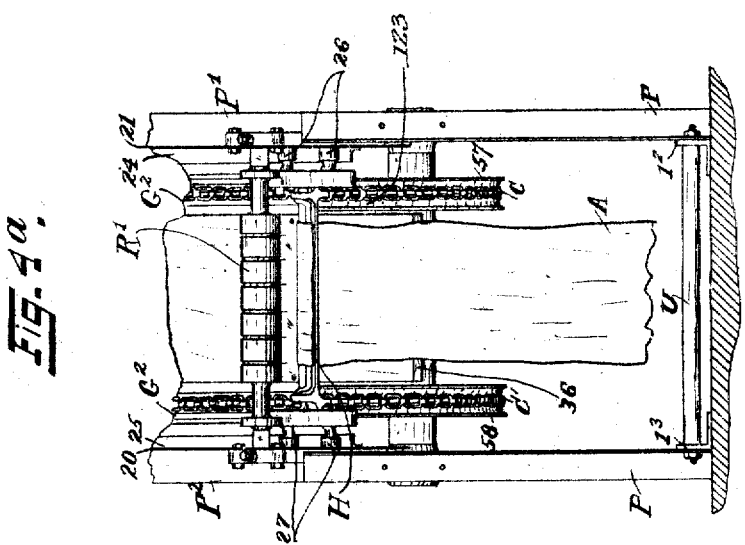
Witnesses:
Charles Horton
H. D. Penney
Inventor:
Cyrus F. Logan,
By his Atty: F. H. Richards

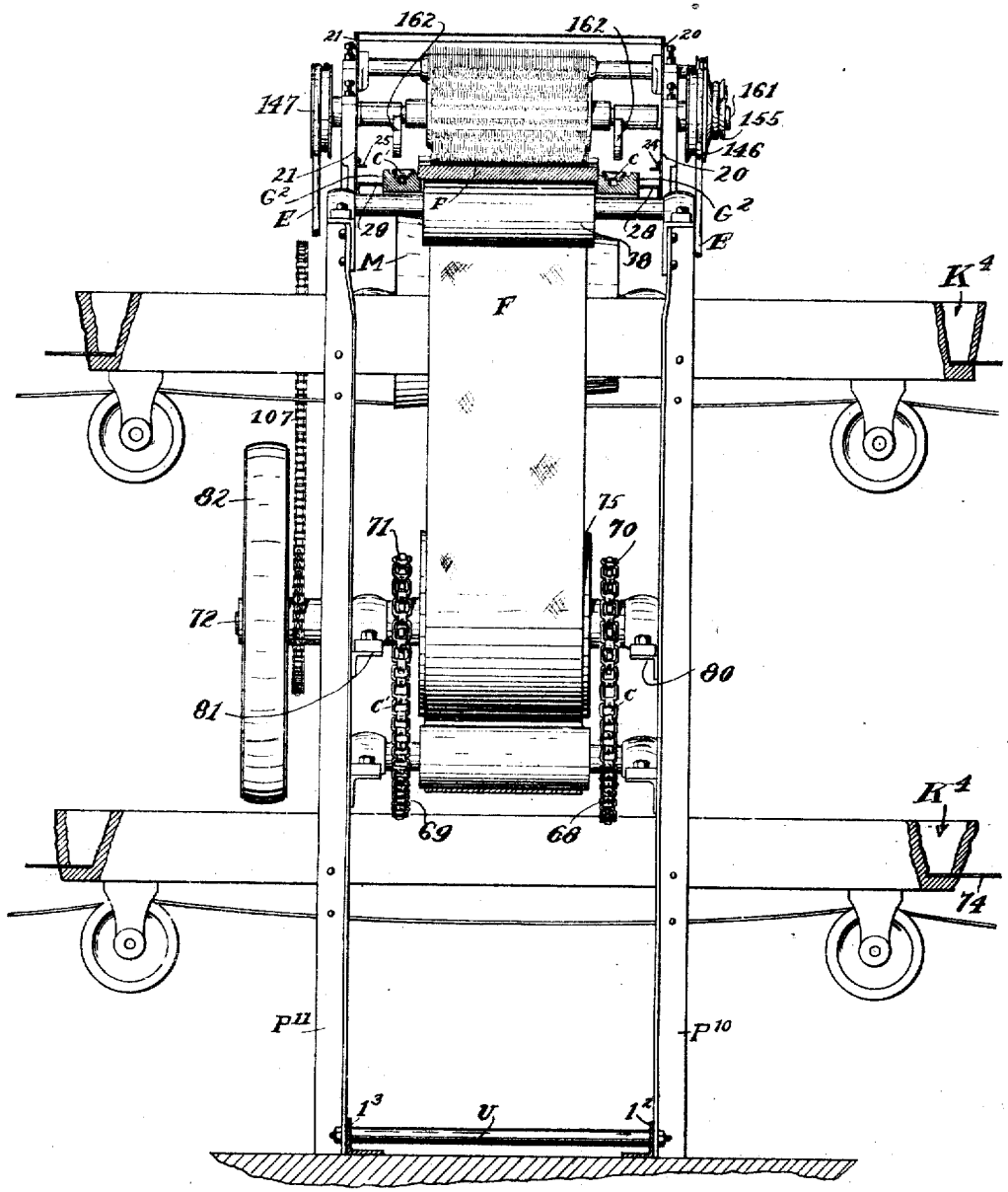

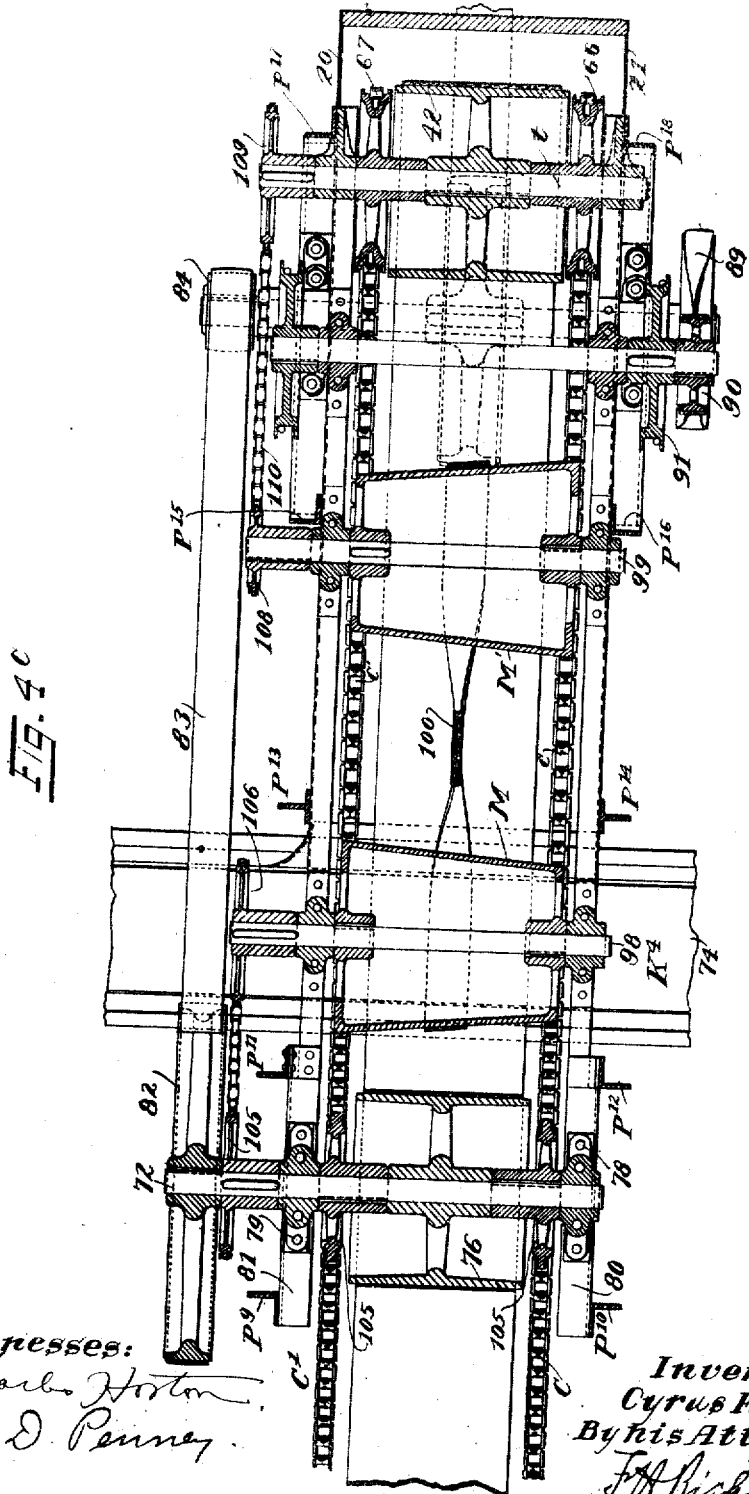

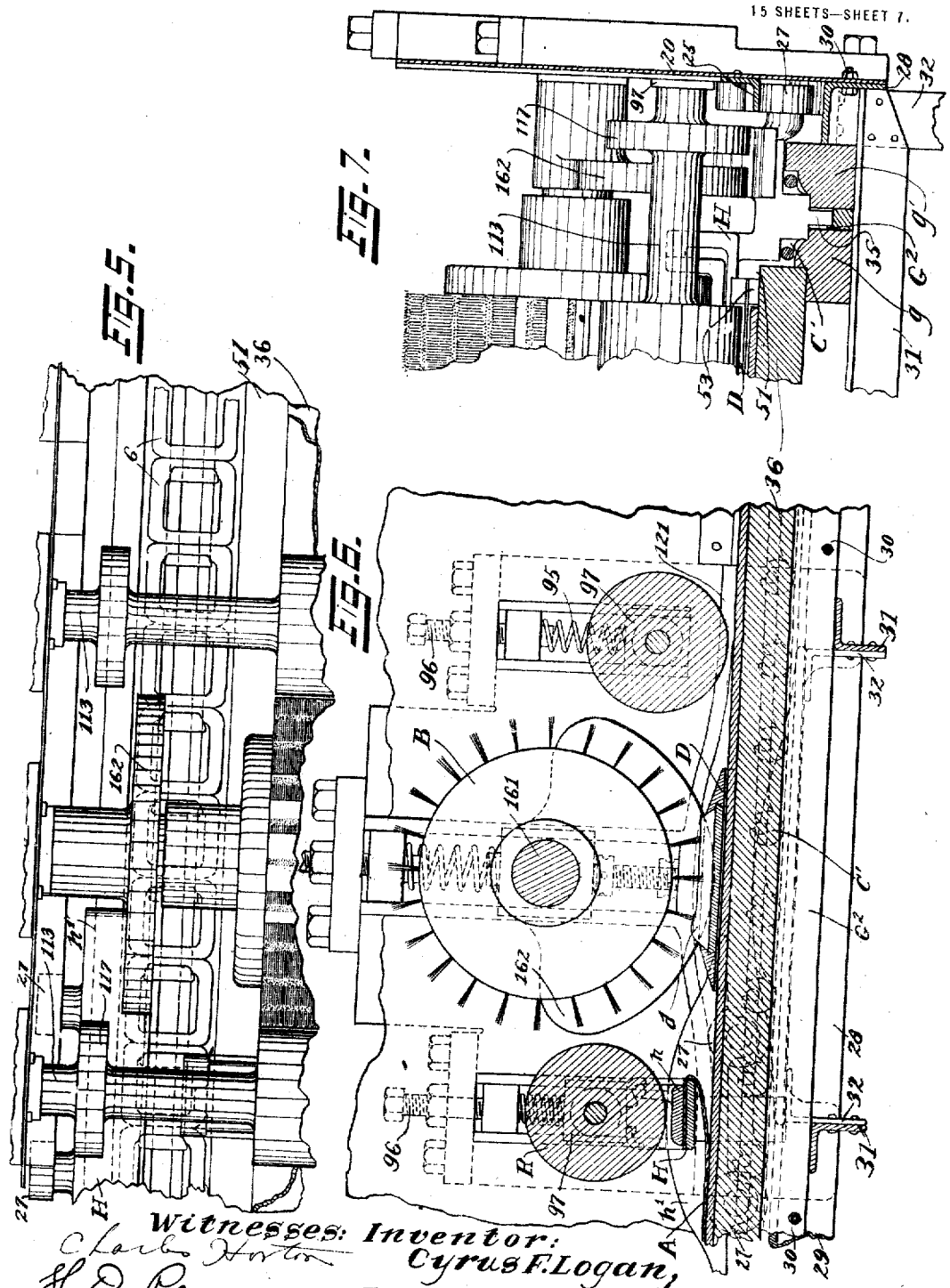

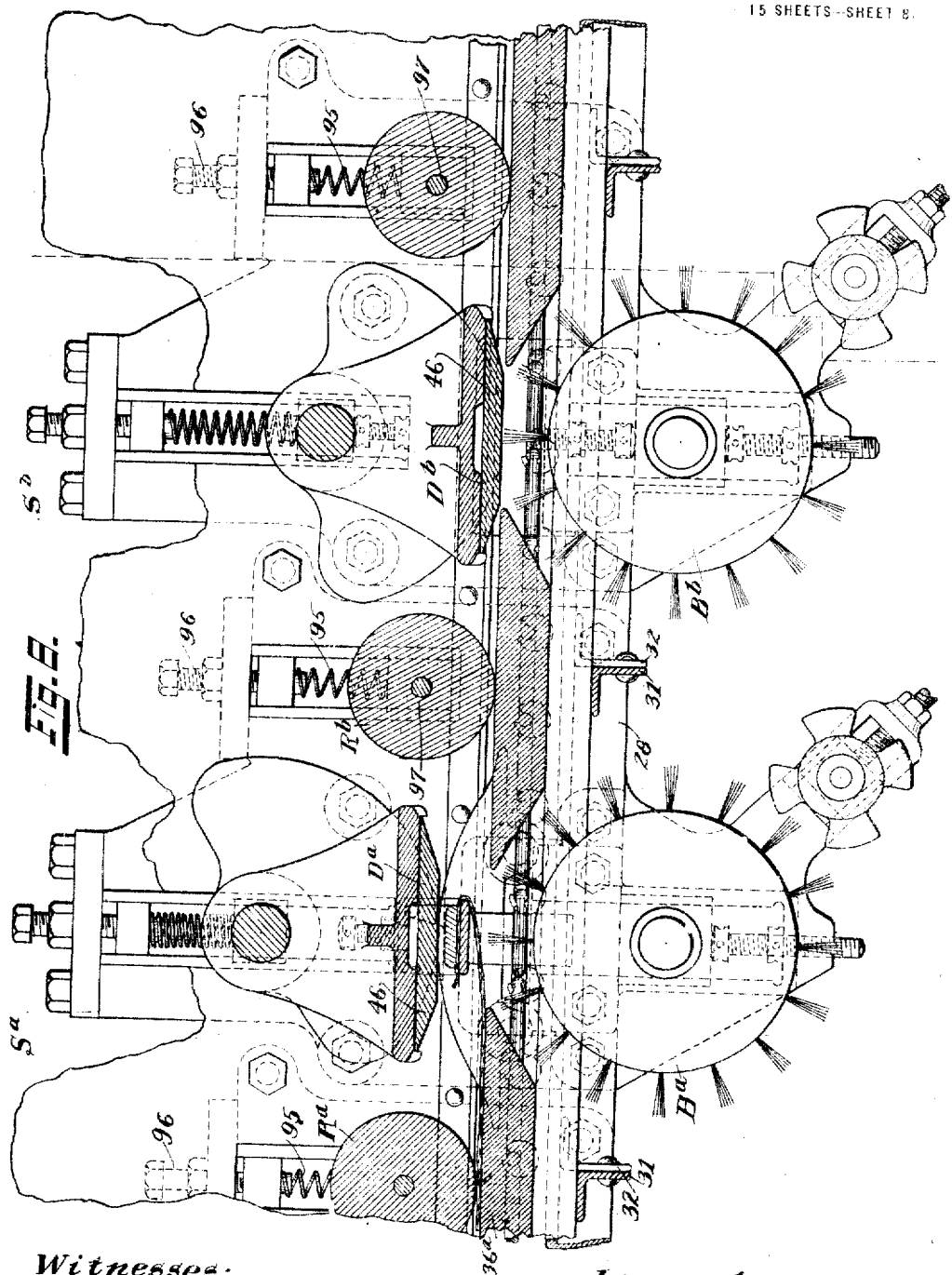

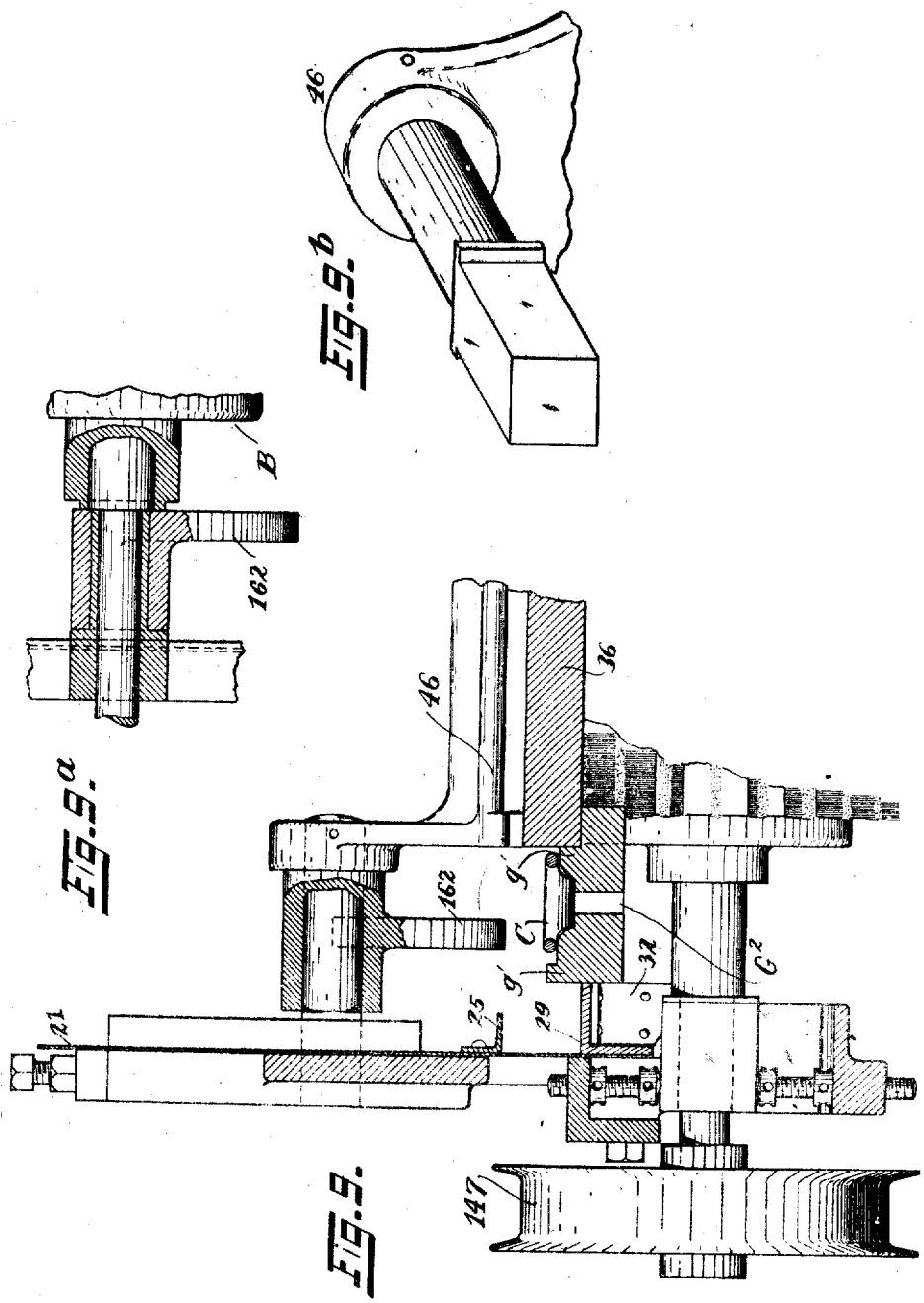

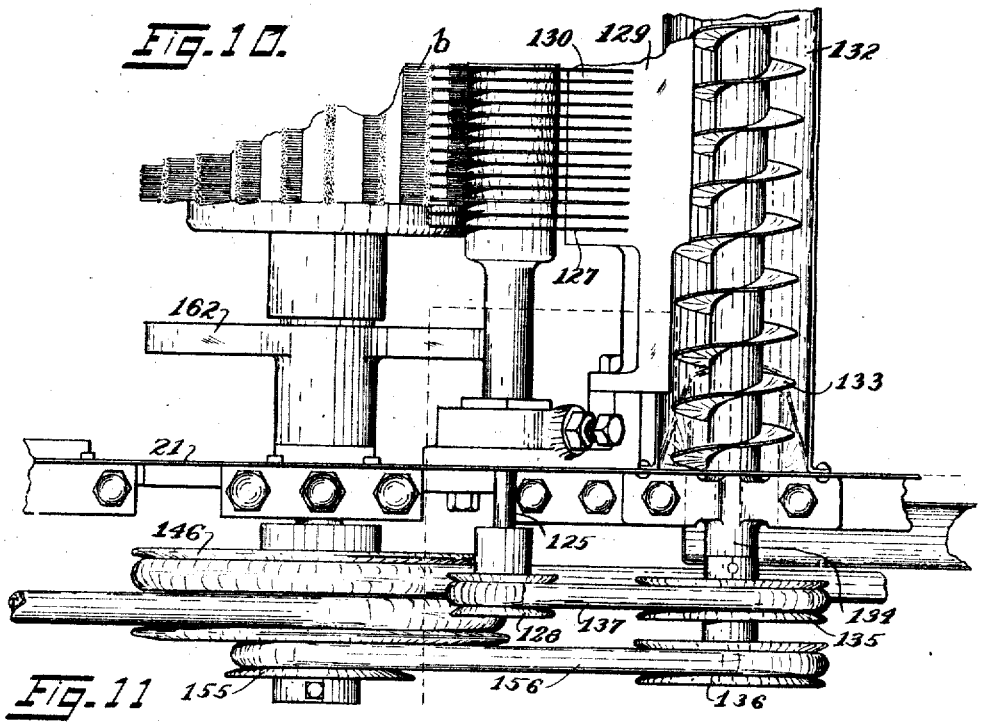
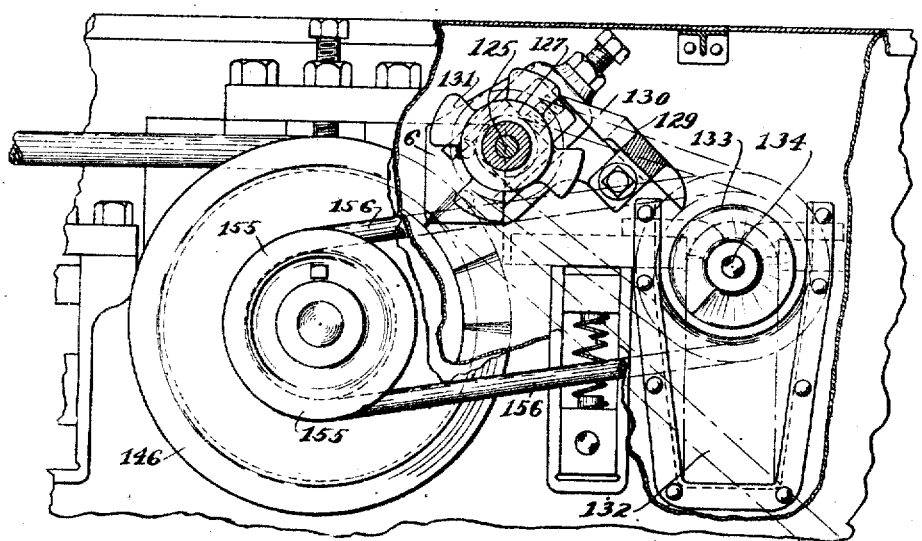

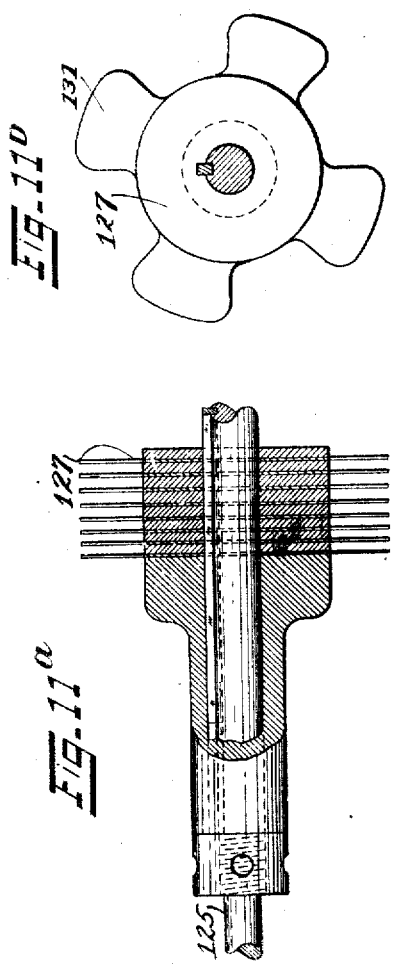
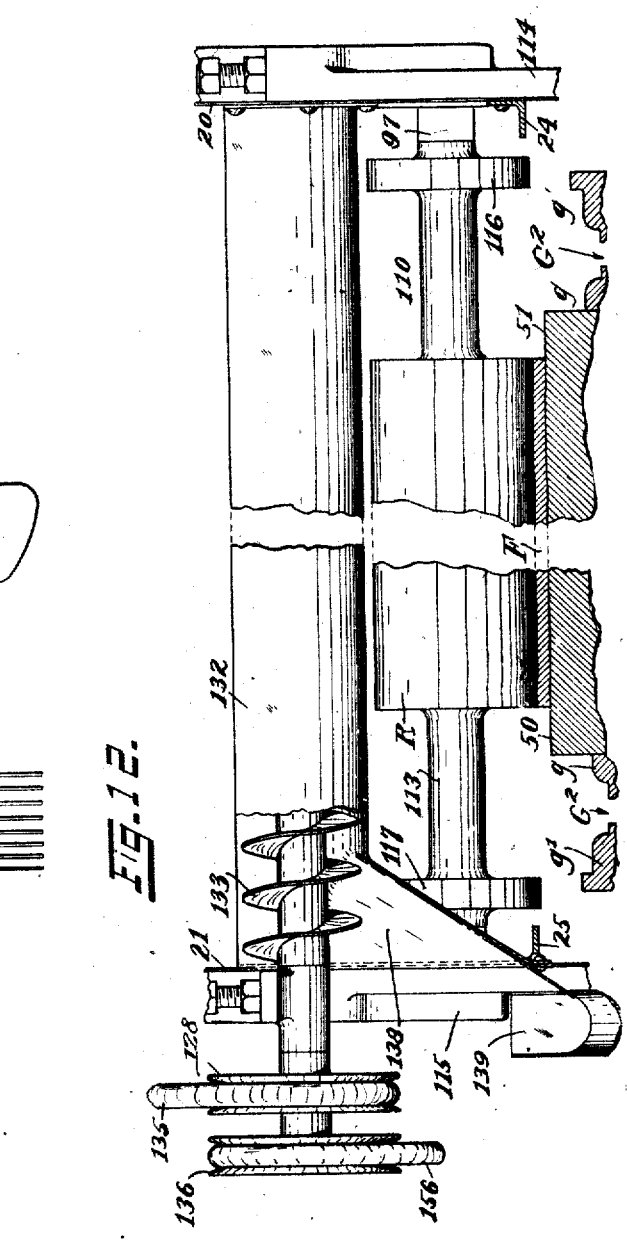

C. F. LOGAN.
FIBER TREATING MACHINE.
APPLICATION FILED DEC. 4, 1914.
1,238,310.
Patented Aug. 28, 1917.
15 SHEETS—SHEET 12.
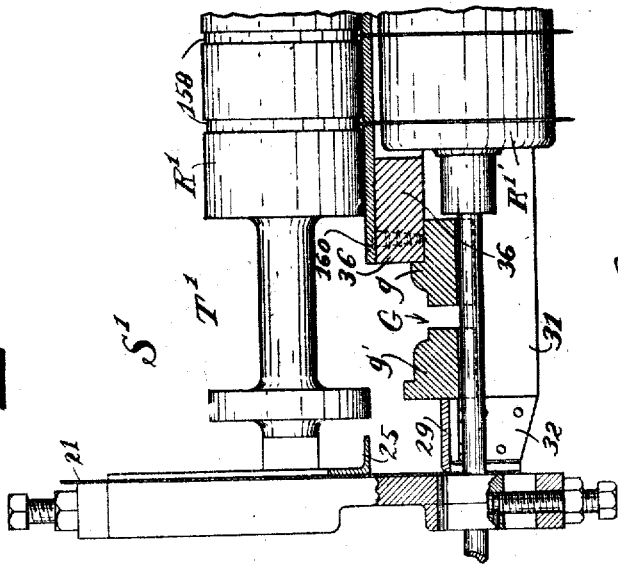
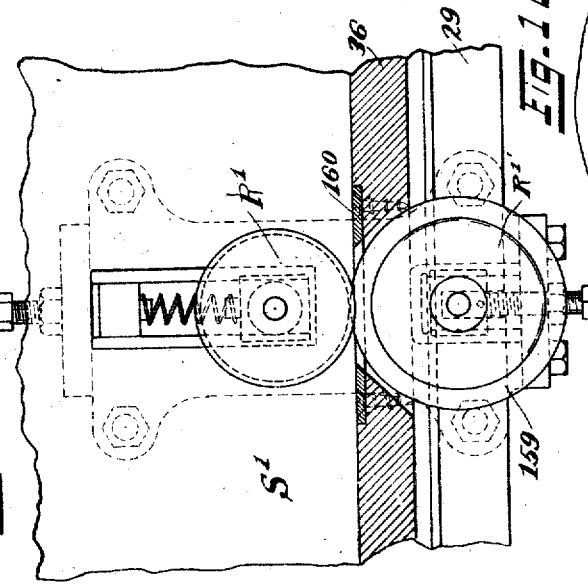
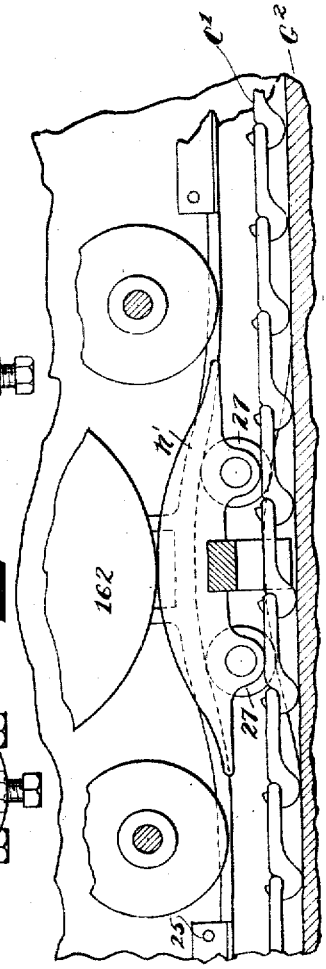
Witnesses:
Charles Horton
H. D. Penney
Inventor:
Cyrus F. Logan,
By his Atty: J. H. Richards

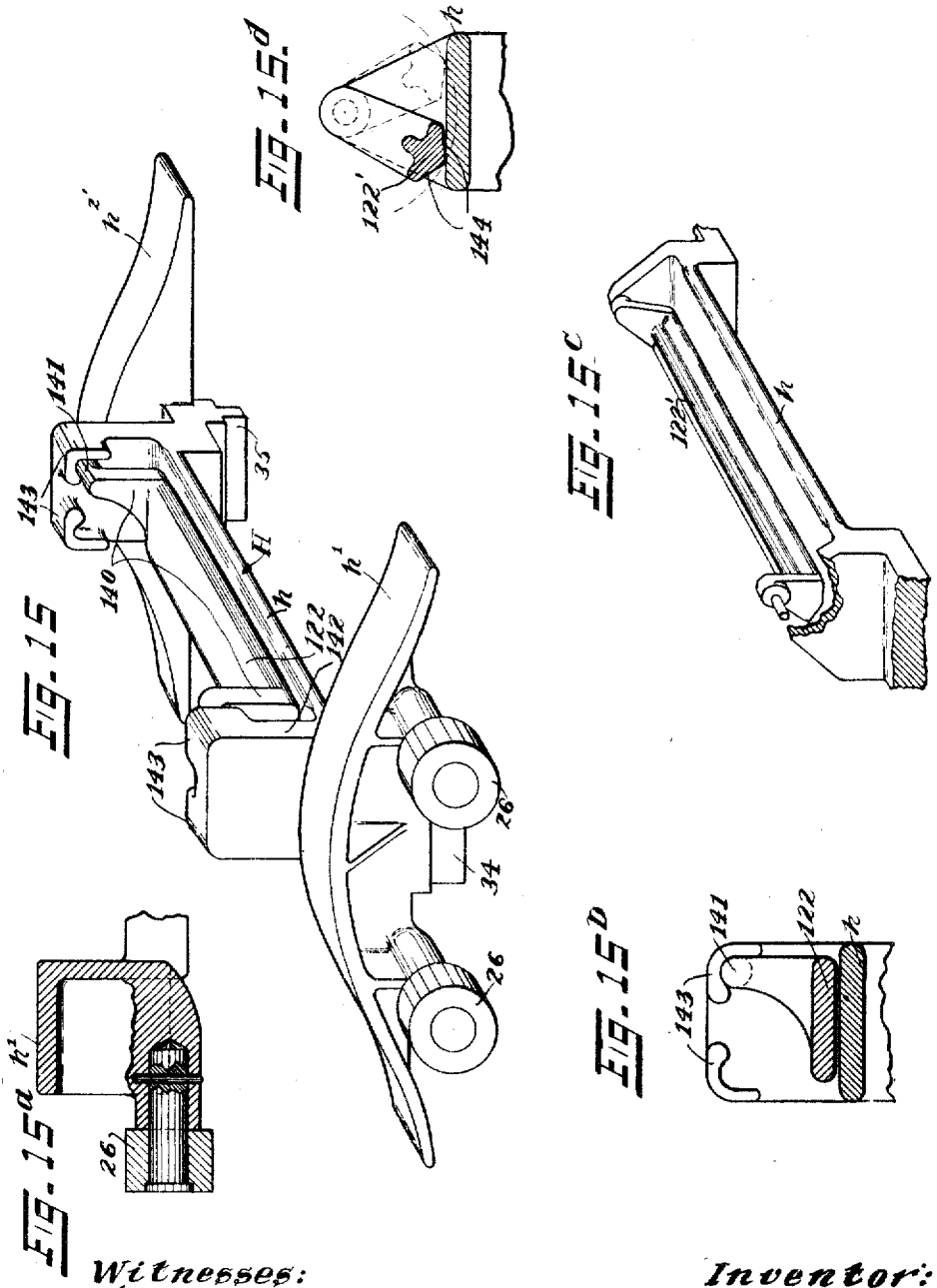

C. F. LOGAN.
FIBER TREATING MACHINE.
APPLICATION FILED DEC. 4, 1914.
1,238,310.
Patented Aug. 28, 1917.
15 SHEETS—SHEET 14.
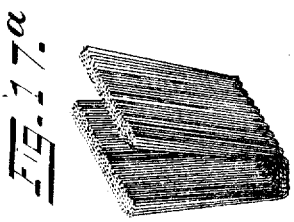
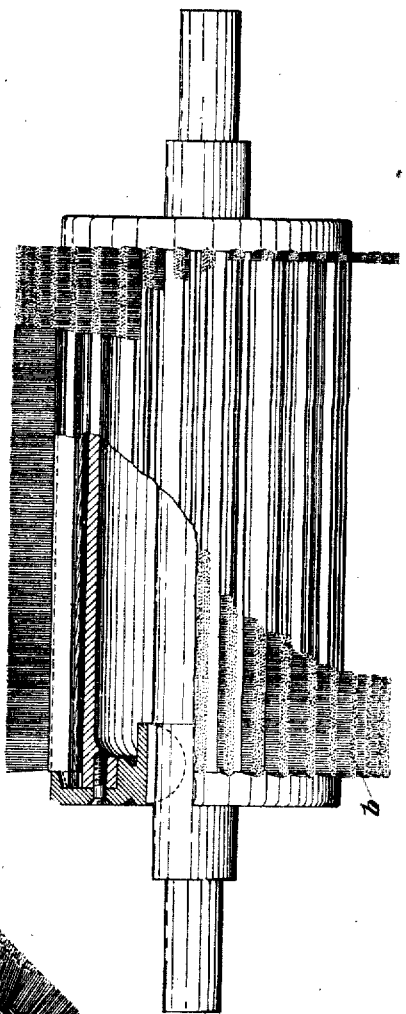
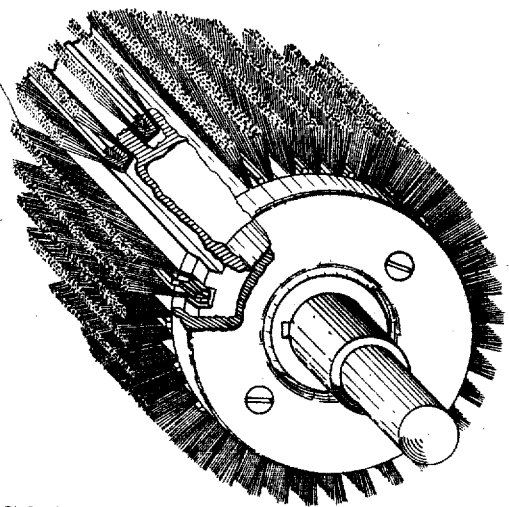
Witnesses:
Chas. E. Whiteman
H. D. Penney
Inventor:
Cyrus F. Logan,
By his Atty: F. H. Richards.

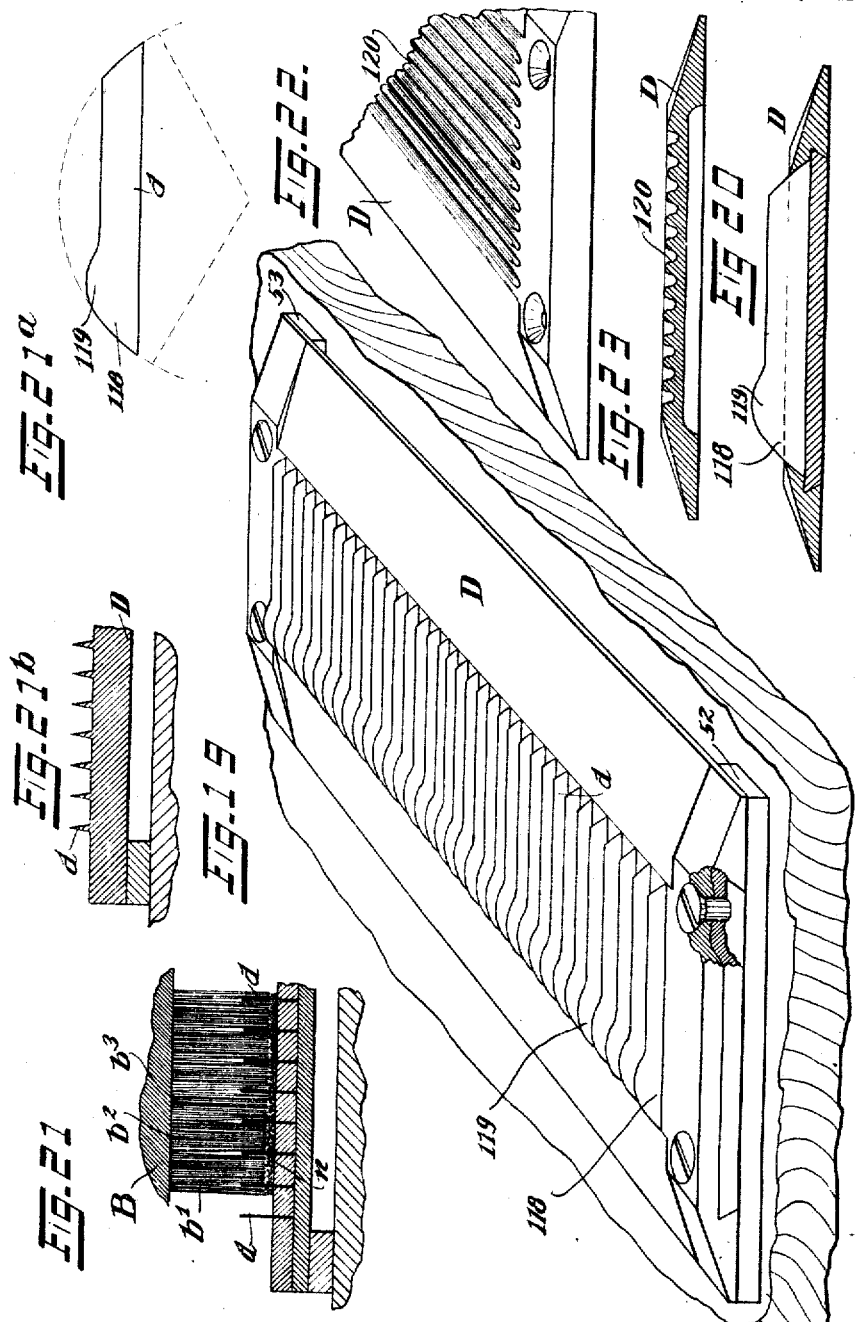

UNITED STATES PATENT OFFICE.

CYRUS F. LOGAN, OF WASHINGTON, DISTRICT OF COLUMBIA, ASSIGNOR TO FIBER PRODUCTS CORPORATION, A CORPORATION OF DELAWARE.

FIBER-TREATING MACHINE.

1,238,310.   Specification of Letters Patent.   Patented Aug. 28, 1917.

Application filed December 4, 1914.   Serial No. 875,454.

*To all whom it may concern:*

Be it known that I, CYRUS F. LOGAN, a citizen of the United States, residing in city of Washington, in the District of Columbia, have invented certain new and useful Improvements in Fiber-Treating Machines, of which the following is a specification.

This invention relates more especially to decorticating or fiber-treating machines for the reduction of long-fiber plants, such, for instance, as certain grasses, hemp, abaca, and sisal, and also the more pulpy kinds of leaves and petioles such as found, for instance, in the banana and many other tropical and fiber-yielding plants.

A principal object of the invention is to provide an improved machine of that class, and one arranged for treating the plants by means of decorticating or reduction appliances which will operate progressively along the length of the plants, and which can also be arranged and adjusted for subjecting the plant-material to successive treatments of varying kinds and graduated intensities.

A further object is to furnish such an improved machine having a plant-conveyer arranged for running in a circuit, or path of travel, and having mechanism-stations located at intervals along such circuit, and at which plant-treating mechanisms are located; also to provide such mechanisms each having one or more plant-treating sets each of which comprises a coacting pair of members arranged for coöperation with the conveyer and with the plant-holding means thereof.

For effecting these objects, and also for effecting other objects which are hereinafter set forth, I have devised a decorticating machine of the class described, and in which a series of the plant-treating sets are arranged along the path of travel of a plant-conveyer which, at intervals along the length thereof, is provided with plant-holding devices and, adjacent thereto, is also provided with mechanism-openers arranged for temporarily separating the members of said sets for thereby providing a passageway through which the plant-holding devices may pass.

The accompanying drawings illustrate my present invention as embodied in an organized system of mechanism and arranged in accordance with a preferred construction thereof.

Figure 1 is a side elevation of the machine, for illustrating one suitable arrangement of a framework, and for briefly indicating,— chiefly in a diagrammatic manner,—the system or mode of arranging the various component devices and mechanisms into a complete machine; in this view certain "mechanism stations" are indicated at positions $S^1$ and $S^7$, as hereinafter more fully explained.

Fig. 2 is a plan view illustrative of the particular arrangement of mechanism as shown in Fig. 1, but with some parts broken away, and with various details omitted, this being done in view of the extremely small scale to which Figs. 1 and 2 are necessarily drawn, as compared with the usual size of the machine.

Fig. 3 is a sectional side-view showing the left-hand portion of Fig. 1 on an enlarged scale, and is also illustrative of certain changes which may be made in the component members of the mechanisms located at the said mechanism stations, and particularly at the station $S^2$; in this view, as in Figs. 1 and 2, some details are merely indicated, or only diagrammatically represented, being more fully shown in subsequent views.

Fig. 4 is an enlarged side-view similar to the right-hand portion of Fig. 1 but drawn on an enlarged scale, and illustrates certain details in a manner corresponding to the illustrations in Fig. 3.

Fig. 4ª is a fragmental front end elevation.

Fig. 4ᵇ is a cross-sectional view taken on line 4—4, Fig. 4, and shows certain details which are located at the right-hand of said line, as seen from the left-hand thereof.

Fig. 4ᶜ is a sectional plan view taken on line 5—5 of Fig. 4, and illustrates, more especially, a preferred arrangement of certain of the driving-shafts, and of certain of the wheels, pulleys, belts, frame-members and bearings, and conveyer-chains shown or indicated in the preceding views.

Figs. 5, 6 and 7, are, respectively, a plan view, a sectional side-view and an end view, all drawn on an enlarged scale, and showing an end-portion of a preferred form of a single plant-treating set such as indicated at stations $S^3$, $S^5$ and $S^7$, Figs. 1 to 4, inclusive, and arranged for brush-treating the plant-material from the upper side thereof; Fig. 6 is drawn in alinement with Fig. 5, and is a view looking in the same direction as in Figs. 1, 3 and 4, while Fig. 7 is drawn in alinement with Fig. 6, and is a view showing the parts illustrated in Figs. 5 and 6 as seen from the right-hand in those views.

Fig. 8 is a longitudinal and vertical sectional view similar to Fig. 6, but showing the plant-treating set of the modified form indicated at stations S⁴ and S⁶, (Figs. 3 and 4), and also as arranged when used in multiple at a single such station, for the brush-treatment of the plant-material from the under side thereof.

Fig. 9 is a fragmentary view taken on a line transversely of the machine, and illustrates certain adjusting and operating devices in connection with a plant-treating set of the arrangement shown in Fig. 8, and as seen from the left-hand thereof.

Fig. 9ᵃ and Fig. 9ᵇ are detail views illustrative of certain portions of the mechanism shown in Figs 7 and 8, as hereinafter explained.

Fig. 10 is a fragmentary plan view of the forward-side portion of a plant-treating set of the arrangement shown in Figs. 5, 6 and 7,—and at said stations S³, S⁵, S⁷,—and illustrates how a brush-cleaning or doffer mechanism, and doffer-cleaning devices may be arranged for coöperation with the brush-member of the set, and also with a debris-collecting and removing apparatus; this view, Fig. 10, may be regarded as showing one end of the same brush-member, B, of which the opposite end is shown in Fig. 5.

Fig. 11 is a side, or front-side, elevation of the mechanism which is illustrated in Fig. 10, and shows the parts as seen from below in Fig. 10; some parts, however, are omitted while others are shown broken away, for more clearly exhibiting certain details.

Fig. 11ᵃ and Fig. 11ᵇ are detail views illustrative of certain features of a brush-cleaning doffer device in the preferred form thereof shown in Figs. 10 and 11, and also indicated at stations S⁵ and S⁷, in Figs. 3 and 4, respectively.

Fig. 12 is a fragmentary view taken vertically and transversely of the machine, for showing in a side-view, one of the presser-rolls,—also one of the collecting troughs adjacent thereto,—as seen from the right-hand in Figs. 10 and 11.

Fig. 13 is a view, on an enlarged scale, of the roll-mechanism shown at station S¹ in Fig. 3, and as seen in the direction of the arrow r¹ in said figure; only about one-half of the length of the rolls are here shown, it being understood (following a conventional practice) that the portion not shown will be, or may be, of the same form and arrangement,—after the principle indicated as to the roll and the details appurtenant thereto, as illustrated in Fig. 12.

Fig. 14 is a view showing the parts illustrated in Fig. 13, as seen from the right-hand in Fig. 13, and looking in the same direction as at said station S¹, in Fig. 3.

Fig. 15 is a perspective view of a hank-bar or carrier, together with mechanism openers arranged one at each end of the hank-bar, and with hank-clamping means also arranged as an appurtenant of the hank-bar member, or carrier-member, which, as a whole, is designated by H.

Figs. 15ᵃ to 15ᵈ, are a series of detail views relating to certain features of the hank-carrying member shown in Fig. 15, and are hereinafter more fully explained.

Fig. 16 is a side view, partially in section and with some parts omitted, of an improved revolving brush, which is shown in a preferred form and construction thereof deemed to be especially suitable for use as the brush-member in such of the plant-treating sets as comprise a brush member.

Fig. 17 is a perspective view of the brush shown in Fig. 16, for more fully and clearly exhibiting certain features and details thereof, including the arrangement of the brush-elements into tufting rows.

Fig. 17ᵃ is a detail view showing (in perspective, as in Fig. 17) a brush-element as prepared for being applied,—with others similar thereto,—to the periphery of the brush-cylinder, and to be applied in a manner to form the "tufting" rows b, b,—see also Fig. 21.

Fig. 18 is a view supplemental to Fig. 6, for more clearly illustrating the operation of certain means and details which may be used in connection with the top-brushing sets, when the hank-bars shall be arranged to travel in a path relatively close to the belt or "table" surface, and so require elevating in order to pass over the brushing-beds.

Fig. 19 is a perspective view of one of a series of brush-beds D, having an improved construction especially adapted for coacting,—in a two-member plant-treating set,—with a revolving brush, for stranding and guiding the material, and also, at the same time, tufting the brush-rows.

Fig. 20 is a cross-section of the brush-bed, taken in a direction longitudinally of the machine, for more clearly exhibiting certain details in a preferred construction thereof which is provided with stranding blades removably fixed in the bed.

Fig. 21 shows a partial transverse section of the bed D, taken in line X, Fig. 20 and also illustrates certain features of the coöperative relations of the brush B with the brush-bed and the stranding-and-tufting blades thereof.

Fig. 21ᵃ is a side view of the removably-fixed stranding-blade shown in Figs. 19 and 20.

Fig. 21ᵇ is a view similar to Fig. 21, for showing a modification of the brush-bed in which the stranding blades are made integral with the blade-carrying plate or brushing-bed.

Fig. 22 is a fragmental perspective of a modified form of brush-bed, preferably to be used at station $S^7$.

Fig. 23 is a cross-section of the modification shown in Fig. 22.

Fig. 24 is a fragmental plan with parts removed showing a portion of the conveyer.

Similar characters designate like parts, in all the views.

In the particular form and arrangement of my present improvements which is illustrated in the drawings, the machine is provided with framework and driving mechanism arranged and equipped for operatively-supporting and actuating a conveyer which moves in a circuit extending from the forward end (at left-hand in Fig. 1) to the rearward end (at right-hand in Fig. 1) of the machine. The conveyer circuit is so arranged that the path-of-travel of the conveyer comprises several runs, each extending from one to another of a series of conveyer-guiding wheels, (Fig. 1), and along one or more of these conveyer runs are a series of mechanism stations, S, which in the present instance, are located two of them at $S^1$, and $S^2$, on the first run of the conveyer, (Figs. 1 and 3), while five of them, $S^3$ to $S^7$, inclusive, are located on the second, or upper and principal run of the conveyer. At each of said stations, S, a plant-treating mechanism is located, and each of these mechanisms comprises or may comprise one or more plant-treating sets; these sets are herein indicated by T, and are arranged in a coöperative relation to the conveyer and also to other portions of the operating mechanism of the machine.

In practice, the machine may be arranged or extended for receiving any required number (either less or more than herein shown) of the stations S along the said upper run of the conveyer. In the present instance, all of said plant-treating sets, from station $S^3$ to station $S^7$, inclusive, are indicated as being of substantially the same character, but this feature of sameness is not essential. In some instances, if desired, the sets T may be of different kinds, and may be arranged for subjecting the plant materials to successive treatments of different kinds, respectively, or to similar treatments applied in different ways and with varying intensities,—this latter method being the one which I have selected for illustration herein.

Any single "plant-treating set" is herein designated,—individually and without choice,—by T; that is, when a "set T" is considered as an individual set and without regard to the particular location thereof in the series of sets; and likewise any plurality thereof is similarly referred to as "sets T", or "plant-treating sets T". For convenience in referring to the locations of successive sets,—whether or not the individual sets are duplicates in arrangement or construction,— these sets are further distinguished by exponents corresponding to those used in designating the several mechanism stations, respectively. Thus the first "set T" located at station $S^3$, is designated individually and with reference to location by $T^3$; and the second "set T" located at the same station, is similarly designated as set $T^{3'}$. Following this notation, the several "sets T" which are located at station $S^3$ may be designated as sets $T^3$, while those at station $S^5$ are "sets $T^5$",—and so on throughout the series.

With these explanations, it will now be understood that in this notation and mode of referring to individual and plural members of any series of similar members, the respective reference characters may be used and understood either with or without their exponents, accordingly as the designation of such member or members is made without choice, or whether it has reference, also, to a particular location, or to another special relation or feature. The principles and mode of reference here briefly stated, is herein extended (without a special or further explanation as to each such instance) to several series of members comprised in the machine, including among others, the brushes B, brush-beds D, stranding blades $d$, presser-rolls R, hank-bar members H, and to various other parts and details, as will be readily noted from time to time in the course of the description hereinafter given in relation thereto.

For the plant-treating sets T, and for use at a majority of the stations S, I prefer a "two-member" construction in which the set will comprise,—as one principal member thereof,—a brush-bed, as D, over which the plant-material will be drawn by the conveyer, and will also comprise,—as the other principal member thereof,—a revolving brush, as B, arranged for acting upon one side of the material while this is supported by said bed D. At the stations $S^3$, $S^5$, $S^7$, the plant-treating sets, T, are shown with the brush members, B, thereof located above the path of travel of the hanks of material to be treated, while at stations $S^4$, $S^6$, said sets are reversed, or inverted, and the brush member B is located below said path of travel.

As already briefly indicated, the plant-treating mechanisms may comprise a different number of sets at different stations, respectively. For instance, in Figs. 1 and 3, the mechanism $S^3$ is shown as comprising two sets, $T^3$, and $T^{3'}$; the same arrangement is also indicated at station $S^5$, Fig. 1. At stations $S^4$, $S^6$, $S^7$, however, each said mechanism is shown comprising only one set, Fig. 6 showing a view corresponding to the arrangement of station S⁷; these mechanisms, however, may be arranged each with a plurality of the "sets T" should occasion require. In Fig. 8, such a plurality (comprising two sets,) is shown arranged in an "inverted" manner; this arrangement may be used, if desired, at station S⁴ or S⁶, or both.

On account of the desirability of making the machine of light-weight so that it may be more readily transported, and also to secure economy of construction with relatively small frame-members, I have herein shown the machine as being assembled on a framework which is so designed that it may be composed almost entirely of ordinary structural steel. By this means the liability of breakage is reduced to a minimum, while the several posts and other similar members may be of such small section as to give a high degree of accessibility to the apparatuses within the framework. These features will be evident from the side view, Fig. 1, in connection with such other views as show portions of the framework.

A series of posts, or uprights, (designated in a general way and without choice, as "posts P") are shown arranged in pairs and in two series along the frame; the series on one side (toward the observer in Fig. 1) are designated by P², P⁴, etc., while the opposite series are designated by P¹, P³, P⁵, etc. At their lower ends the posts P are secured to a pair of sills 1², 1³, which preferably are strongly connected together by cross-bars, as U, Fig. 4ᵇ, or in other suitable and convenient manner. On the posts P, several horizontal beams are shown affixed in positions proper for supporting the various shafts and other details in any required locations. It will, of course, be understood that, as usual in similar machine-framing, the frame members may be secured by riveting, or may be removably connected together by suitable bolts and screws, in a well-known manner.

For carrying the several plant-treating mechanisms, and the sets of coacting devices comprised therein, I have selected for illustration herein, a top-frame so designed as to support the principal series of the bearings and guides, and their related details, upon a pair of vertically-disposed side-walls as 20, 21, consisting of relatively thin plates,—preferably of structural steel,—which are or may be, provided at various points thereon, with openings and attached devices for removably holding in place the various operative devices. Said side-walls 20, 21 are shown supported by the said two series of posts, respectively, and as being extended at one end (at the left-hand in Figs. 1 and 3) for carrying the mechanisms at stations S¹, S²; and, at the right-hand end (see Figs. 1 and 4) said side-walls are shown extended to form the sides 22, 23, of the hank-trough K².

Between the said side-walls, and adjacent to the lower edges thereof, a floor structure is arranged for carrying the conveyer chains C, C', and the belt-form traveling bed F. Guiding means such as guide-rails 24, 25, are also secured to the inner sides of the side-walls 20, 21, respectively, for coacting with rollers, as 26, 27, carried on the hank-bar member H, see Figs. 5, 6, 7 and 15. Throughout the machine, the framework components and, in general, the various details affixed thereto, or directly or indirectly carried thereby, may be said to be symmetrically arranged, those on one side corresponding with those on the other side, after the usual manner of "rights and lefts."

As one convenient means for supplementing and connecting said side-walls 20, 21, with the supporting post members, and with the floor structure, I have shown the framework provided with two top-rails, as 28, 29, each of which may be of angle-section and applied with one flange horizontal, and the other flange vertical, disposed to form a seat, as in Fig. 7, against which the side-wall 20, may be removably fixed by screws 30, located at suitable intervals along the top-rail. A series of cross-beams as 31, are shown supported by some suitable clips or attachments, as 32, (Figs. 6 and 7), from said top-rails. Supported on the cross-beams, are two conveyer guides, G², G² located respectively near the sides of the machine. In the present instance, these guides or track-rails are each shown comprising an inner chain-guide g, and an outer chain-guide g'; between and upon these guides the conveyer-chains C, C', are shown supported and guided throughout the upper run of the conveyer. A space between the chain-guides g, g', (Figs. 7 and 9), provides room for the depending draft-arms, or hooks 34, 35, of the hank-bar member H, and also prevents the accumulation in the chain-guiding channel, of an undue amount of dirt or plant debris.

The cross-beams 31 also serve to support (directly or indirectly) a table or platform, as 36, located midway of the width of the machine and between the said conveyer guides. In the present instance, however, I have shown said table member supported by the edges thereof resting on the inner edges of the inner chain-guides g, g, (see Figs. 7 and 13), and at various places in the length thereof, openings are made in said table through which the respective operating devices located below the table may operate on the hanks of material as these are drawn along over the table. These arrangements are shown in Figs. 3 and 4, where openings are shown for the belt-wheels 37, 38, 39, 40, 41 and 42, and for the revolving brushes B⁴ and B⁶, while the table lengths 43, 44 and 45, constitute supporting platforms for the respective runs F¹, F² and F³, of the traveling belt-bed F. This arrangement provides the short tables 46, 47, for the presser-rolls R⁴, R⁴′, respectively, at station S⁴, (Fig. 3), and also provides the similar tables 48, 49 for the presser-rolls R⁵, R⁵′, respectively, at station S⁵,—see Figs. 3 and 4. The table lengths 43, 44 and 45, and also the chain-guides G², G³, are represented in the drawings as being of such proportions that in practice, hard wood may be used for the manufacture thereof; but if preferred, said table and guides may be made of a suitable metal, and the design and supporting details be modified or re-arranged accordingly.

The table 36 is made wider than the belt F, to provide a surface as at 50 and 51, Figs. 5, 7 and 12, whereupon to support the brush-beds, as D, of those plant-treating sets which have the brushes located above said beds; this arrangement is shown as regards the sets at stations S³, S⁵ and S⁷. The proper elevation of the brush-bed, as D, Fig. 19, for permitting the belt F to run freely thereunder, may be obtained in various ways, as for instance, by means of blocks, as 52, 53, Figs. 7 and 19, fixed in place under each end of the bed D, and held by suitable screws; or, the brush-bed may be so formed as to have thereon a depending block-portion of proper size, as will be obvious by a comparison of the drawings as herein described.

My present improvements are especially intended and arranged for treating the fiber of banana stalks or petioles and other similar vegetable products, in accordance with a process which involves a progressive division of the material into strands or narrow zones and the reduction or separation of the gummy or adhesive parts of the material by a brushing or analogous operation which is applied in the first instance to the strands or separated zones at a point adjacent to the line where the separation is proceeding. Also the process of treatment, when fully carried out, involves a supplemental brushing or clearing operation applied to the fibers while these are progressively carried along between and under the control of separating blades and brushing or like fiber treating appliance whereby the fibers will be subjected to a secondary cleaning operation. A further feature relates to the treatment in the manner above indicated of the fiber while guided along in the separated strands or zones by appliances operating first on one side of a series of such strands and then by similar or analogous appliances arranged for operation on the opposite side of such a series of strands. In this manner the fibers, especially such long and relatively strong fibers as are contained in the banana plant, are progressively cleaned of their adhesive gums and coating materials, and this is done by means of operations which are of a gentle character and thereby avoid a destructive action upon the fibers while, at the same time, securing a peculiar efficiency of operation.

One feature of my invention relates to a system of successive plant-treating mechanisms,—each of which may have a series of plant-treating sets that are individually of different characters,—combined with a conveyer arranged for coacting with one said mechanism and also with a belt-form traveling table or bed which is coöperative with a second said mechanism but not with the first one. This system, or organization, is particularly indicated in Fig. 3, and also, as to certain parts thereof, in Fig. 1. The belt or "table" member, F, is shown extending under a guide-roll 54, on shaft 55, and thence upwardly and rearwardly to and over the wheel 37 on shaft 60 and then forwardly (toward the right-hand) toward the delivery-end of the machine. The conveyer-chains C, C′, however, (see Fig. 3) after passing over the supporting wheels 56 on said shaft 55, run under wheels 57 and 58, on shaft 59, and over chain grooves in wheel 37 so that from the lower wheels 57 and 58 to said upper wheel 37, there is a considerable length of conveyer which is not directly coöperative with the belt-bed, but which coacts with a mechanism arranged for initially and preliminarily treating the plants, and, consisting, in the present instance, of three two-member sets and three supplemental presser-rolls; these sets may, however, be of a different number, and, if desired, one or more of the presser-rolls may be omitted.

The said mechanism for the initial and partial treatment, (preliminary to a second, and usually a different and more thorough treatment), is shown in Fig. 3 arranged in an inclined position, but this inclination or location is a matter of convenience and serves to economize space, and while it is deemed to be desirable, it is not an essential feature. Said mechanism for initial treatment is indicated as a whole by S¹, while the three successive two-member sets which, in the present instance, are comprised in the mechanism are designated by T², T²′, respectively. For more fully providing for the effective initial treatment of a variety of leaves or plant stems, and especially those of a thick and pulpy character, I have shown the sets T², T²′ and T²″, each arranged for a different kind of action upon the material. The set T′ comprises some suitable presser-rolls, as R¹, coöperative with either a similar or a different roll or revolving member, as R¹′, of which one preferred kind is more fully shown in Figs. 13, 14, hereinafter more fully described.

The second said set, at T², is shown comprising an upper bed or guide-member D², and a revolving skiving-wheel, V. By means of this set, a thick leaf may be cut away to some limited amount, on the pulpy side thereof. The debris thus obtained may be guided by guards, as 61, 62, into a debris receiving means such as the trough K, located transversely of the machine and provided with a belt-form bottom 63, by which the material so accumulated may be carried away and delivered into a suitable tank or vehicle (not shown) for transportation to an apparatus for the manufacture of by-products therefrom. The final set, at $T^{2''}$, is shown comprising a bed-member, as $D^{2''}$, (which may be similar to said bed $D^2$ of said second set $T^2$) and a revolving drum 64 having therein a series of revoluble rollers 65, for subjecting the material to a considerable amount of roller treatment applied to the under side thereof and before reaching the belt-form table-surface at the wheel 37.

By a preliminary treatment such as here outlined, certain kinds of herbaceous materials,—including, for instance, the larger petioles of banana trees,—may be divested of a considerable proportion of the pulpy components thereof, and so be prepared for a more effective reduction without injury to the long fibers, in the brushing mechanism, at $S^3$, which is coöperative with both the conveyer C, C' and the belt-table F. It will, however, be understood that in some instances any one or more of the said sets at $S^3$, $S^5$ and $S^7$ may be employed and this to the exclusion of one or more other sets; also, in some instances, the entire mechanism $S^2$ may be omitted, but in such case I prefer to use a pair of presser-rolls at $S^1$ or $S^2$ for steadying and straightening out the hanks of material immediately following the placing of the same on the conveyer at $S^1$. In some instances, only the skiving-set V will be used, while in other instances, only the rolling-set 64 will be operated. Also it will be understood that when the mechanism $S^2$ comprises three such or similar sets, at $T^2$, $T^{2'}$, $T^{2''}$, any one or more of these sets may remain idle while another or others is operated.

After passing the initial-treatment mechanism $S^1$ and $S^2$, and passing over the chain-guiding wheels at 37, (see Fig. 1), the conveyer-chains C, C', pass along the top of the machine to the guide wheels at 66, 67, (Fig. 4$^c$) then down to and under the discharge-wheels 68, 69 (Fig. 4$^b$) above the fiber-receiving trough $K^4$, and thence to and over the conveyer-driving wheels 70, 71, on the driving shaft 72. The discharge-run 73, of the conveyer (from wheels 66, 67 to wheels 68, 69, Figs. 1, 4, and 4$^b$) is arranged parallel to an inclined guide-trough $K^3$, by which the long hanks of fully treated fiber will be guided into the said delivery trough $K^4$, which is shown provided with a carrier belt 74, forming a conveyer for removing the finished fiber stock. In practice the trough-belt 74 may be carried to a considerable distance to one side of the machine, and there deliver the hanks onto a table or to another conveyer, (not shown), for transporting the hanks to any desired point.

When the hank-bar member H travels down the rear inclined portion or discharge run 73, it is maintained in the conveyer-chains C, C' by means of the guide rails 24, 25 which extend down the whole run to the edge of the trough $K^4$ above which trough are located the wheels 68, 69. Should the depending trough arms or hooks 34, 35 due to binding or the like, cling to the links and conveyer-chains C, C', they will be thrust out by the teeth of the sprocket or discharge wheels 68, 69.

In a manner somewhat analogous to the conveyer, the belt F makes a circuit extending nearly the whole length of the machine, but with one difference:—at one or more locations, the belt is carried down, then forward, and then upward and forward, for thereby forming a gap, or space, for the inverted brush-and-bed sets, as at the locations $S^4$ and $S^6$, (Figs. 1, 3, 4). This belt-gap is well shown in Fig. 3, where the belt F after passing the wheel or drum 37, extends forwardly under the sets $S^3$, and then turns downwardly upon the pulley 38, then under the large wheel 75, and, next, upwardly to the pulley 39, from which the belt runs forwardly again and passes under the brush-and-bed sets at $S^5$. In a similar way, the belt is shown running over the wheels 40, 76, 41, (Figs. 1 and 4) for making the gap or spaces for the inverted set $S^6$.

One of the driving shafts, in this instance the shaft 72, is located in position for carrying the carrier-belt wheel 76, directly below the inverted set $S^6$. This arrangement provides a double use for said pulley or wheel 76, which serves to turn and direct the belt F from the descending run under station $S^6$ into the ascending run of same station (Fig. 4). Said shaft 72 is also located relatively to the discharge wheels 68 and 69 in a position favorable for maintaining in a taut condition, all of the runs of the conveyer from the receiving station of the circuit, at $S^1$, to the discharge station at $S^9$, (Fig. 1) where the hank-bars are dropped off from the conveyer onto the trough-belt 74.

In Fig. 1, and more clearly in Fig. 4, the shaft $t$, which carries the terminal wheels for both the belt F and the conveyer, is shown located so far distant from the fiber-treating station $S^7$, that the hanks of material, usually and preferably, will be drawn clear of that mechanism before, or by the time, the hank-bars, respectively, pass over into the descending channel at 77, on their way down the inclined trough K⁸ to the transfer or delivery trough at S⁹.

In the preferred arrangement illustrated in Fig. 1, the inclined position of the delivery trough K⁸, provides a convenient location for the main driving shaft 85. This main shaft 85, may be driven by a driven pulley 86, fixed thereon and connected by a belt 87, with some source of power, (not shown). A smaller driving pulley 84, fixed on the shaft 85 is shown connected by a belt 83, with a large driven pulley 82, fixed on the conveyer-driving shaft 72; through this shaft 72, and the variable-speed driving apparatus elsewhere herein described, the belt-bed F is also driven in the present instance. The main shaft 85 is also shown provided with a pulley 88, which is connected by the crossed-belt 89 with a pulley 90, whereby to drive the larger pulleys 91 and 92 from which a rope-drive E is operated for revolving the system of brush-members located at the several mechanism stations S³, S⁴, S⁵, S⁶ and S⁷, respectively.

For driving the several brush members B and rotative cleaning means 126 and 127, a rope drive E is provided. In the present instance, although not necessarily, each of the shafts for the brushes B have at both of their ends pulleys 146 and 147. The rope drive E on both sides of the apparatus is substantially identical, and therefore the detailed description of one will suffice for the other. The rope drive E at the front side of the machine passes from the pulley 91 in the direction of the arrows over the idlers 148, 149 and 150 of the take-up 151, (the take-up 152 of the rope drive E at the rear side of the apparatus being shown below the take-up 151), then passes over the pulley 153 of the initial treating station S¹, makes a complete turn around this pulley, then passes under and around the pulleys 146 of the station S², then over the idler 154, then over and around pulleys 146 of station S³, then under and around pulley 146 of station S⁴, then over and around pulleys 146 of station S⁵, then under and around pulley 146 of station S⁶, and again over and around pulley 146 of station S⁷ back to pulley 91. Those pulleys 146 at the front side of the machine which are connected with brushes provided with cleaning means have in addition each an auxiliary pulley 155. These pulleys 155 are connected by belts 156 with the pulleys 136 on the stub shafts 134 of the feeding means or screws 133 by means of which such screws 133 are rotated.

One object of arranging a plurality of sets at a single mechanism-station, is to provide means for treating the material in a given manner with one intensity, and then repeating the treatment in the same manner but with a less or a greater intensity. At station S³, for instance, the pressure of the brush B³ of the first set T³, against the brushing-bed D³ may be so adjusted as to be either greater or less than the pressure of the brush B³′ of the other set T³′, against the brushing-bed D³′. Also, I provide the successive "brushes," as B³, and B³′, with rows of "bristles" of different kinds, either as to size or flexibility or both, so that the effect or intensity of action of a given ' set" upon the material may be regulated within a wide range. In a similar manner, the character of the action of each said mechanism upon the material, may be regulated throughout the whole series of those mechanisms, from station S³ to station S⁷, and thereby graduate and apply the treatments in a progressive manner, and this as regards both the top-brushing series and the under-brushing series of sets. By these means and methods, the successive treatments may be so regulated as to have, at first, an increasing intensity or action, and, later, to have a progressively decreasing action, which in some instances is deemed to be important, especially as the fibers approach nearly to a fully cleaned condition.

In the preferred arrangement of the mechanisms as herein illustrated, each of the brush-members of the sets is preceded by a presser-roll, and also a similar roll is, or may be, used immediately following such brushing member. In Fig. 3 for instance, at station S³ and in set T³, the brush B³ coacts directly with the brushing-bed D³, while the preceding roll R³ coacts with the belt-bed F and thus subjects the material to a pressure and rolling treatment immediately preceding the combined stranding and brushing treatment. Said belt F is preferably made of fiber fabric combined with rubber, for thereby securing a slightly yielding surface into which small and hard masses of the material may be pressed by the roll, and thus permit the roll to be effective upon the softer and more mobile of the substances which are then adherent to the plant fibers. Thus, at station S³, the set T³ coöperates with the conveyer, the belt-bed F, and roll R³, to treat the fiber in a regulatable manner, and principally for removing a portion of the less resistant adherent substances; and this kind of treatment is, or may be, repeated by a next following set, as T³′, at the same station,—also at the subsequent station S⁵.

After passing the top-brushing station S³, the material is drawn by the conveyer through a plant-treating set, as at station S⁴, Fig. 3, and is there treated by a different kind of rolling action with an intermediate brushing-treatment applied from below the hanks of material. This arrangement is further illustrated in Fig. 8, and at station S⁶, Fig. 4. At station S⁴, since the belt F is there carried downward over the wheel 38, the presser-roll R⁴ coacts directly with the fixed table surface at 46 (usually and preferably a metal table or plate), and thus, by reason of the unyielding character of such table, operates mainly upon the harder and more resistant portions of the substances then adhering to the plant fibers, which are next subjected to a brushing action between the lower brush B⁴ and the upper brushing-bed D⁴. In Fig. 8, which is a modification of stations S⁴ and S⁴, there are provided two sets Sᵃ and Sᵇ, the second set Sᵇ, comprising brush Bᵇ, bed Dᵇ, and roll Rᵇ, is arranged for repeating the described rolling and under-brushing treatment.

A further feature of the said operations as performed at said stations S³ and S⁴, relates to another kind of difference in the manner of roll-treating the material. At said station S³, as explained, the roll R³ coacts with the moving belt F, but in the set T⁴ at station S⁴, the material is subjected to a roll-treatment while opposed by a fixed surface against which the material has a sliding action under pressure. Thus the material at one time is subjected to a rolling-action free of any substantial amount of drawing action, and then,—after an upper-side brushing,—is subjected to a roll-treatment combined with a sliding and drawing action, this being followed by a reversed brushing treatment. By thus subjecting the material to successive treatments of diverse kinds and character, and applied some in repetition, and some in alternation and in a reverse manner, the successive plant-treating sets may be so adjusted and operated as to subject the plant fibers to a minimum of destructive action, while the series of treatments may be so extended as to effectively clean the fiber of adherent non-fibrous substances by means of operations each of which performs only a small portion of the total work.

Another feature of importance in the operation of the machine, relates to the means whereby a tension or restraining force is applied to the material, or to the strands or fibers thereof, by the coöperation of the conveyer and its hank-bars and mechanism openers, in connection with the presser-roll which next precedes a plant-treating set. This feature is illustrated in Figs. 6 and 8, showing, respectively, two successive stages of the operation. In Fig. 6, the roll R is shown in the lifted position, being supported for the moment by the openers, or lifters h¹ and h¹′, which are (in the present instance) located on the chains, C, C′, at the ends of the hank-bar h; this is shown in Fig. 6 in connection with the upper-brushing set T. On the further advance of the lifter, as h¹, to a position as in Fig. 8 relatively to the roll Rᵃ, this roll is lowered onto the hank A, and the lifter h¹′ passes along and lifts the upper member of the set; in Fig. 6, that upper member is the brush B, while in Fig. 8, the upper member is the brushing-bed Dᵃ. This lowering of the roll R binds the hank A onto the belt F in Fig. 6, and onto the fixed table 36ᵃ, in Fig. 8; the force of said binding action being regulatable by the springs 95 and screws 96, (Figs. 6, 8) whereby the roll-bearings 97 are forced downwardly in a simple and well-known manner which will now be evident from a comparison of the drawings without a more detailed description.

This mode of operation, especially on, and for, the initial stranding of the hank as by set T (Fig. 6) at station S, serves to clamp (by a spring-pressed roll) the material, as A, upon the belt F, so that the brush B, on being again lowered to working position, will directly coact with said belt and roll for forcing the material down upon the stranding blades d. As one means for increasing the efficiency of this coaction, and the proper performance of the stranding operation, the belt-bed F may be given a forward speed somewhat less than that of the conveyer; the amount of this speed-variation will depend, in practice, somewhat upon the materials being treated, and on speed of operation and other incidental conditions, but these are readily ascertainable by trial. The effect of the clamping combined with the reduced belt speed, will evidently be to render more taut that part of the hank A between the presser-roll R and the hank-bar H.

For regulating as may be required, the forward movement of the belt-bed F relatively to the conveyer, any of the well-known variable speed driving mechanisms may be employed, and may be readily adapted to the present requirements. As an illustration of one such mechanism, I have shown in side view in Fig. 4, and in plan view in Fig. 4ᶜ, a conical-pulley drive of a well-known kind, but arranged for use in connection with my present improvements. The belt-guiding pulley 76 is supposed to be loosely mounted on the conveyer-driving shaft 72, while the belt is to be driven by the terminal pulley t. A pair of conical pulleys M, M′, are mounted on shafts 98, 99, and are arranged in reverse positions, as shown in Figs. 1, 4 and 4ᶜ. A belt 100 drives the pulley M′ from the pulley M, and a belt-guide 101, which is shown carried on slide 102 and operated by the screw 103 and hand-wheel 104 may be used for operating the belt-guide. By this or other suitable means the belt 100 may be shifted along the pulleys M, M′, and so regulate the speed of the pulley 42 relatively to the pulley 82, in the usual and well-known manner. The first conical pulley M may be driven in any suitable manner, from some part of the machine, as for instance, by a chain wheel 105, on shaft 72 and chain wheel 106 on said shaft 98 of the conical pulley M, and a drive-chain, as 107, connecting said chain wheels. In a similar manner, chain wheels 108 and 109 are fixed on shafts 99 and $t$, respectively, and connected by the drive-chain 110. The belt-pulley 42 being fixed on the shaft $t$, this pulley will now be driven from the conveyer-shaft 72, at a speed determined by the proportionate diameters of the conical pulleys M and M' at those points in the length thereof at which the belt 100 may be located at any given time.

At the initial station $S^1$, as shown in Figs. 3, 13 and 14, there is provided a slitting device having an upper row $R^1$ provided with annular recesses 158 in its roll surface, to receive the annular knives 159 on the roll $R^{1\prime}$ disposed below such upper roll $R^1$ between which rolls there is provided a platform 160 provided with slots to permit the annular knives 159 to pass therethrough and into the annular recesses 158. This slitting device is provided to initially slit the lower skin of the leaf to be treated to facilitate the flattening of the leaf by the rollers $R^1$ and $R^{1\prime}$ without injuring the inner fibers of the leaf for future treatment.

This improved construction of a revolving brush is regarded as being preferable for the service required in a decorticating machine of the class herein illustrated and described, especially because of the facility with which the brush components, as $b$, Figs. 16, 17 and $17^a$, may be replaced for thereby renewing the wires or brush sections when these become too much worn for effective use. In practice, however, other arrangements, or well known means, may be employed for holding the brush wires or elements in place on the body of the brush.

Special means are provided for cleaning the brushes which are illustrated in Figs. 3 and 4 as applied to the stations $S^3$ and $S^7$ inclusive. In Figs. 10 to 12 inclusive these cleaning means are illustrated in enlarged detail. For the stations $S^3$, $S^5$ and $S^7$, the cleaning means are mounted above the movable table F. At the stations $S^3$, $S^5$ and $S^7$, directly in the rear of and above each brush there is mounted a shaft 125 transversely disposed of the movable bed F on which shaft there is fixed a cleaning means which at station $S^3$ are the brushes 126 and at stations $S^5$ and $S^7$ are doffers 127. These doffers are illustrated in full size in Figs. $11^a$ and $11^b$. The shafts 125 extend beyond the rear of the side wall 21 and each has a pulley 128 mounted on said rearwardly extending end. Positioned directly under the rear of each of the cleaning brushes 126 and doffers 127, there is provided a comb 129 disposed at an inclined plane to the path of movement of the movable bed F, with its tines 130 extending between the bristles 126 and between the blades 131 of the doffers 127 so as to remove the fibers collected on such cleaning means. Directly below the lower end of each of the combs 129, there is provided a trough 132 extending transversely of and above the path of movement of the movable bed F and supported by the side walls 20 and 21. In each of such troughs 132, there is provided a screw 133 having a stub shaft 134 extending through the side wall 21 on which stub shaft there are provided two pulleys 135 and 136, the pulley 135 being connected to transmit motion to the pulley 128 by means of a belt or rope 137. At the front of each of the troughs 132 and at the bottom thereof, there is provided an opening 138 at which openings there are provided chutes 139 connected to the troughs 132 and extending into debris receiving means, the chute 139 of the first set $T^3$ carrying the debris from the cleaning means of the brush $B^3$ into the conveyer trough K, the chutes 139 of the sets $T^{3\prime}$ and $T^5$ carrying the debris to the conveyer trough $K^1$, and the chutes 139 from the sets $T^{5\prime}$ and $T^7$ carrying the debris to the conveyer trough $K^2$. The cleaning means for the brush $B^4$ is the same as the cleaning means for the brushes $B^3$ and $B^{3\prime}$ except that the debris collected by the cleaning means for the brush $B^4$ is allowed to drop directly into the conveyer trough $K^1$ and the cleaning means for the brush $B^6$ is the same as the cleaning means for the brush $B^7$ except that the debris collected by it is allowed to drop directly into the conveyer trough $K^2$.

For raising the brushes $B^3$, $B^{3\prime}$, $B^5$, $B^{5\prime}$ and $B^7$, the shaft 161 is provided at each of its ends with a mutilated disk 162 loosely mounted thereon and having its enlarged portion normally suspended below the level of the shaft 161 by its weight. When the hank-bar member H rides under the brushes B, its lifters $h^1$ and $h^{1\prime}$ will engage these mutilated disks 162 and partially rotate them about their shaft 161 and at the same time raise the shaft 161 and the brushes mounted thereon. Obviously, a full disk could be used just as effectively for raising the brushes. For raising the brush beds at stations $S^2$, $S^4$ and $S^6$, the same raising means are provided which will be designated by like reference characters.

For the pressing means or presser-rolls, as R', $R^2$, $R^{2\prime}$ ... $R^7$, $R^{7\prime}$, in some instances a plain metal cylinder may be used, especially where employed for pressing the hanks onto the traveling belt F. In other instances, particularly when used on plants of a delicate character, the roll may have a surface of a slightly yielding character, such as a firm leather, rubber, or other suitable kind. In some instances, also, the metal roll-surface may be formed of a spirally wound metal strip, (not shown), preferably formed upon a yielding body or core; one suitable roll of this class is described, for instance, in U. S. Letters Patent No. 852,399, dated April 30, 1907.

While the presser-rolls, in practice, may be supported in various ways as regards the bearings therefor and the minor details appurtenant thereto, I deem it to be usually preferable to employ for such purposes, the arrangement which is herein illustrated, and which is more fully shown in Figs. 5 to 10, inclusive. In Fig. 12 the presser-roll is shown in side view, and as resting on the belt F; in this view the middle part of said roll is shown broken away in a conventional manner for indicating that the length of the roll may be varied as occasion may require. From the ends of the roll R the roll shaft ends 112, 113, extend outwardly and have journals fitted to turn freely in bearings 97, 97, located between guideways in the brackets 114, 115, which are secured to the side-walls 20, 21, respectively of the framework of the machine. On the shaft-ends 112, 113, rollers, as 116, 117, are placed for engaging with the mechanism lifters (see $h^1$, $h^{1'}$, in Figs. 5 and 6) when the hank-bar member H passes under said rollers.

In practice, the several stationary beds or brush-beds D may be of uniform construction, as regards their coaction with the brush-members B, at all of the stations S where the sets T comprise a brush-member; in some instances, however, different kinds or varieties of such members D may be employed at successive stations. For instance, I have herein shown the beds $D^a$ and $D^b$,—(Fig. 8) as each having a plain surface on the side thereof facing the revolving brush, which directly coacts therewith. At each of the stations $S^3$, $S^4$, $S^5$, $S^6$, $S^7$, however, I have shown a brush-bed, as $D^3$, $D^4$, $D^5$, $D^6$ and $D^7$, respectively, of an improved construction which is more fully illustrated in the detail views Figs. 19 to $21^a$, inclusive.

The brushing-bed D, is provided with stranding-blades or ribs, $d$, and coacts with the revolving brush B in several ways. In connection with the conveyer, the brush and said blades operate to divide or "strand" the hank of plant-material into strands which are each drawn over the upper surface of the bed-plate and under control between adjacent blades $d$,—$d$, Fig. 21. Also, the blades operate to divide the row, as $b$, (Fig. 21), of brush-elements, (whether or not these are bristles or wires), into tufts or bunches, as $b^2$, $b^3$, which closely fill the space, between adjacent blades, so that during the passage of that brush-tuft or bunch over the brush-bed, the brush-elements are closely guided by such blades while passing along and acting upon the strand, as $n$, Fig. 21, of material between the same blades. Thus while stranding the hank of material, the blades, $d$, $d$, also segregate or bunch the brush-elements into tufts or bunches having a proper correspondence with the strands, and then operate to guide such brush-tufts or bunches while these pass along and act upon the moving strands while these are also guided and restrained against lateral displacement by the same blades.

The combined stranding and guiding blades, as $d$, may be made, in practice, of such sizes, and of such proportions as to thickness, width or height, and length, as may be found best adapted for use in treating any given kind of fiber-plant. For treating some plants, including banana leaves of medium sizes, I deem a lateral spacing of from one-eighth to one-fourth of an inch apart, to be a suitable distance between the blades, as $d$, Fig. 21; and the height may have approximately the same range of dimensions. The blades $d$ may have the stranding-ends, as at 118, made relatively thin or sharp, so as to act as a dividing tool; which may also be raised as at 119, to serve as a piercing instrument at the moment when the hank, as at $n$, Fig. 21, is being pressed down onto the brushing-bed by the lowering brush.

While the construction and arrangement of the brush-bed herein described,—particularly in connection with Figs. 19, 20, 21, $21^a$,—is deemed to be preferable in some cases, other modes of forming or applying the guides $d$ may be adopted. For instance, as indicated in the small sectional view, Fig. $21^b$, the brush-bed D, may have the guides $d$ formed integrally therewith, or, if preferred, the guides may be applied in various modified forms and arrangements without departing from the spirit and scope of my invention.

In Figs. 22 and 23, another bed-form is illustrated in which, instead of the blades $d$, a series of flutes 120 is provided disposed transversely to the path of movement of the movable bed $f$ by means of which the hank may receive a beating treatment which is preferably to take place at the end of the treating operation as, for instance, at station $S^7$.

The hank-bar is provided with fiber-holding means,—preferably consisting of some suitable clamping device,—and also with (lifting) actuator devices constituting a mechanism opener, and arranged for shifting plant-treating devices one relatively to the other, for thereby opening a bar-passage between the operative and non-operative members or devices. This space or passageway is shown at 121, Fig. 6, where the hank-bar H is shown at a point about midway as its movement under the presser-roll R, which is represented as being lifted relatively to the traveling belt-form bed F. In Fig. 8, a modified mode of action is illustrated, as regards the mechanism-openers, which are here arranged for lifting the non-rotating member D<sup>a</sup> of the coacting members or fiber-treating pair, or unit S<sup>a</sup>. This unit, or pair, comprises an adjustable brush B<sup>a</sup> fixed to rotate below the path of movement of the hank A, above which is vertically movably mounted the non-rotating member or brush bed D<sup>a</sup>.

While the hank-bars H, with their attached mechanism-openers $h^1$, $h^{1'}$, are assembled on the conveyer-chains,—see Figs. 5, 6, and 7,—said mechanism openers have the same operative relation to the coacting devices of the machine as they would have if permanently placed on said chains. Hence, if desired, such mechanism-openers may be fixed in place on the chains, either by a removable attachment or by some construction thereof in one piece with a chain link. This arrangement, however, has a disadvantage which is obviated by combining the mechanism-openers with the hank-bars in a more permanent-manner, since with the latter construction, the combined bars and openers are readily placeable by the operator at any desired distance apart, and thus accommodate such spacing to the length of the material. When, a hank for instance,—and whatever the length thereof,—has been placed on the conveyer, the next following hank can be so placed as to bring the forward end thereof just rearwardly of the preceding hank, and so on indefinitely.

This arrangement, therefore, avoids loss of space lengthwise of the conveyer, and enables the operator to arrange hanks of varying lengths in close succession, without having the longer ones overlap those following next in order. In practice, also, an ample supply of hank-bars can be kept at hand, and the hanks of material can be applied to the bars regardless of the operation of the machine, so that any required number of operatives may be employed on that part of the work, while a single operator places the previously prepared hanks on the machine. This system has the important advantage of permitting the machine to be operated at a relatively high speed, since the hank-bars can be properly placed by a single operator in proper position on the conveyer chains, much more rapidly than the hanks of material can be arranged and applied to these bars by one workman. Incidentally this arrangement also provides for the widely varying periods of time required by an operative in arranging the hanks, owing to variations in the materials, and to accidents and delays from various causes.

One feature of the invention relates to the arrangement,—in connection with plant-conveying means,—of a plurality of the brush-and-bed fiber-treating sets in reversed directions, respectively, with relation to the hanks of material to be treated. This feature is well shown in Fig. 6, where the set at T has the brush member B located above the bed-member D, whereas in Fig. 8 the brush member B<sup>a</sup> is located below the bed-member D<sup>a</sup>. In each said arrangement, however, the mechanism-openers operate to separate one member from the other by a sufficient amount to permit the hank bars H to pass between. In the said set (Fig. 6), the brush member B is the liftable member, while the bed D remains stationary, but in the set (Fig. 8), the brush-bed D<sup>a</sup> is the liftable member, while the brush B<sup>a</sup> remains stationary, being (adjustably-fixed) at a proper elevation. Also one of the sets (as T<sup>3'</sup>, Fig. 3) having a brush-member arranged in the liftable manner, is located in position for acting on a given hank of material in advance of the set (as T<sup>4</sup>, Fig. 3) having the bed-member thereof arranged in the liftable manner. And this pair of sets is supplemented by another set—preferably a similar set,—(as T<sup>5</sup>, Fig. 3) located for re-treating the upper side of the hanks, and having the brush-member thereof arranged in the liftable manner, and this cycle of treatment being repeated as many times as desired.

A preferred mode of applying the material, as A, to the hank-bar H, is shown on a relatively large scale, in Figs. 6, 8 and 15<sup>b</sup>. The operator, taking in hand one of said bars, applies the bar to the end of a suitable quantity or "hank" of the leaves, stalks or the like, to be treated, and closes the clamp-bar 122, onto the end portion of the hank (Fig. 15<sup>b</sup>). Next, the hank-bar, still held in the hand, is turned over to position (Fig. 15<sup>b</sup>), and then inserted into the machine,—preferably and usually at about the location 123, Fig. 4<sup>a</sup>. In thus placing the hank-bar,—with the hank wrapped thereon,— the projections or bar-drivers 34, 35, enter into spaces in links of the conveyer-chains C, C', respectively; and, thus the hank-bars, one after another as they are placed in position, become assembled with the coacting operative parts of the machine, and during their passage through the machine constitute a part thereof. In some instances, however, if for any reason deemed preferable, the hank-bars may be fixed in place and permanently remain on the conveyers; the operators will then place and remove the material by a modified manipulation.

The means for clamping the fiber to the fiber holding means or hank-bar H (see Figs. 15 and 15<sup>b</sup> inclusive) are as follows: The movable clamping bar 122 has at each of its ends an upwardly extending arm 140 disposed nearer one of its longitudinal sides than the other, at the upper end of each of which arms there is provided an outwardly extending finger 141 which engages in a bearing formed on an upwardly extending arm 142, one being provided at each end of the hank-bar H, between the lower ends of which arms 142 there is provided the stationary clamping arm or hank-bar h. The bearings in these arms 142 are formed by the inwardly extending shoulders 143, one provided at the front and one at the rear upper end of each arm 142, these front and rear shoulders being provided so that the hank-bar H can be reversed when desired or the movable clamping arm 122 interchanged when desired. Obviously, instead of these shoulders 143 bearing orifices could also be provided.

In Figs. 15$^c$ and 15$^d$, another form of movable clamping arm is shown in which there is provided only one pivotal bearing and the clamping arm is intended to remain as a fixed part of the hank-bar H. The movable clamping arm 122' in this form is adapted to swing about its pivotal point so as to clamp the fibers either at the front or the rear side of the fixed arm h. This clamping arm 122' is provided with two clamping faces 144, 144, which are inclined to one another, one face to be used as the clamping surface when the arm is swung in one position and the other face to be used as the clamping surface when the arm is swung to the other position.

The desired retractive action, or tensioning stress, upon the plant-strands, may be obtained by the gripping of the hank of material between the belt or table F and the rollers R', R'', and then by so regulating the speed of these coacting gripping members, as to provide for the hank-bars,—owing to the slightly greater speed of the conveyers C, C', to move forward more rapidly than said gripping-members R', R''. Naturally, this excess of the draft-movement,—this being a positive one,—tends to draw the hank, and the strands and fibers thereof, forwardly from between the said bed F and presser-rolls R' . . . R'', while there is a rolling movement of the presser upon such material; and, evidently, this forward excess draft of the hank, results in some slipping of the material under said presser-rolls R' . . . R'', thus adding to the rolling-crushing action, the further factor of a rubbing action.

One feature of the invention relates to the operating of the rollers R' . . . R'' with a forward surface-velocity less than that of the bed F, for thereby increasing the aforesaid rubbing-action upon the material being treated. In some instances, this difference of said movements may be carried to the point of turning the roll in a reverse direction, so that the difference as between the two said velocities will be greater than the forward velocity of the bed F. For instance, when the bed F moves forwardly with a speed of plus five, and the roll-surface R, with a speed of plus four, the difference will be plus one; but if the roll turns reversely at the speed of 1, (which is a speed of minus one, as regards a forward movement), then the total of the said difference of speeds, as to forward movement, is plus six. In this manner a large amount of the rubbing factor of the treatment, can be readily obtained, especially when the machine is employed on plants of some varieties.

For convenience of description, the material being treated has been indiscriminately designated as fibers in the claims. Obviously, when the material receives its initial and preliminary treatments, as for instance, at stations $S^1$ to $S^3$ inclusive, the material being treated is not yet in the form of fibers.

I claim:

1. In a plant fiber treating machine, the combination with a support, of a continuous conveyer operatively mounted on said support for carrying the plant fibers to be treated, a plurality of stations in the path of movement of said conveyer, means provided at such stations for treating the plant fibers while being carried by said conveyer, and a movable bed on said support traveling adjacent to said conveyer and in the same direction as said conveyer.

2. In a plant fiber treating machine, the combination with a support, of a continuous conveyer operatively mounted on said support for carrying the plant fibers to be treated, means provided along the path of movement of said conveyer for treating the plant fibers while being carried by said conveyer, and a movable bed on said support traveling adjacent to said conveyer and in the same direction as said conveyer and serving as a bed for the plant fibers.

3. In a plant fiber treating machine, the combination with a support, of a continuous conveyer operatively mounted on said support for carrying the plant fibers to be treated, means provided along the path of movement of said conveyer for treating the plant fibers while being carried by said conveyer, and an interrupted movable bed on said support traveling adjacent to said conveyer in the same direction as said conveyer.

4. In a plant fiber treating machine, the combination with a support, of a continuous conveyer operatively mounted on said support for carrying the plant fibers to be treated, means provided along the path of movement of said conveyer for treating the plant fibers while being carried by said conveyer, and means mounted on said support and forming movable beds traveling adjacent to said conveyer and in the same direction as said conveyer.

5. In a plant fiber treating machine, the combination with a support, of a continuous conveyer operatively mounted on said support for carrying the plant fibers to be treated, means provided along the path of movement of said conveyer for treating the plant fibers while being carried by said conveyer, and a belt mounted to travel on said support adjacent to said conveyer and in the same direction as said conveyer to form a bed for the plant fibers being treated.

6. In a plant fiber treating machine, the combination with a support, of a continuous conveyer operatively mounted on said support for carrying the plant fibers to be treated, means provided along the path of movement of said conveyer for treating the plant fibers while being carried by said conveyer, and a belt mounted on said support to intermittently travel adjacent to said conveyer and in the same direction as said conveyer to form a bed for the plant fibers being treated.

7. In a plant fiber treating machine, the combination with a support, of a conveyer operatively mounted on said support for carrying the plant fibers to be treated, means provided along the path of movement of said conveyer for treating the plant fibers while being carried by said conveyer, auxiliary conveyers mounted in said support under, and transversely of, said first mentioned conveyer for receiving and carrying away the debris being removed from the plant fibers in their treatment, and an interrupted movable bed traveling adjacent to said conveyer and in the same direction as said conveyer and serving as a bed for the plant fibers, said movable bed being interrupted above said auxiliary conveyers to allow the aforementioned debris to drop onto said auxiliary conveyers.

8. In a plant fiber treating machine, the combination with a support, of a conveyer operatively mounted on said support for carrying the plant fibers being treated, means provided along the path of movement of said conveyer for treating the plant fibers while being carried by said conveyer, auxiliary conveyers mounted in said support under, and transversely of, said first mentioned conveyer for receiving and carrying away the debris being removed from the plant fibers in their treatment, and a belt mounted on said support to intermittently travel adjacent to said conveyer and in the same direction as said conveyer to form a bed for the plant fibers being treated, said belt being diverted from said first mentioned conveyer to pass beneath said auxiliary conveyers to allow the aforementioned debris to drop onto said auxiliary conveyers.

9. In a plant fiber treating machine, the combination with a support, of a conveyer operatively mounted on said support for carrying the plant fibers being treated, means provided along the path of movement of said conveyer for treating the plant fibers while being carried by said conveyer, debris receiving means mounted in said support along said conveyer for receiving the debris being removed from the plant fibers in their treatment, and an interrupted movable bed traveling adjacent to said conveyer and in the same direction as said conveyer and serving as a bed for the plant fibers, said movable bed being interrupted above said debris receiving means to allow the aforementioned debris to drop onto said debris receiving means.

10. In a plant fiber treating machine, the combination with a support, of a conveyer operatively mounted on said support for carrying the plant fibers being treated, means provided along the path of movement of said conveyer for treating the plant fibers while being carried by said conveyer, debris receiving means mounted in said support along said conveyer for receiving the debris being removed from the plant fibers in their treatment, and a belt intermittently traveling adjacent to said conveyer and in the same direction as said conveyer and serving as a bed for the plant fibers, said belt being diverted from said conveyer to pass beneath said debris receiving means to allow the aforementioned debris to drop onto said debris receiving means.

11. In a plant fiber treating machine, the combination with a support, of a conveyer operatively mounted on said support for carrying the plant fibers to be treated, means provided along the path of movement of said conveyer for treating the plant fibers while being carried by said conveyer, a movable bed on said support traveling adjacent to said conveyer and in the same direction as said conveyer, and pressing means for pressing the plant fibers being treated against said movable bed to assist the treating means in treating the plant fibers.

12. In a plant fiber treating machine, the combination with a support, of a conveyer operatively mounted on said support for carrying the plant fibers to be treated, means provided along the path of movement of said conveyer for treating the plant fibers while being carried by said conveyer, a movable bed on said support traveling adjacent to said conveyer and in the same direction as said conveyer and serving as a bed for the plant fibers by means of which the tension of the plant fibers while being treated is regulated.

13. In a plant fiber treating machine, the combination with a support, of a conveyer operatively mounted on said support for carrying the plant fibers to be treated, means provided along the path of movement of said conveyer for treating the plant fibers while being carried by said conveyer, a movable bed on said support traveling adjacent to said conveyer and in the same direction as said conveyer and serving as a bed for the plant fibers, and adjusting means for regulating the speed of said movable bed to assist the movable bed in regulating the tension of the plant fibers while being treated.

14. In a plant fiber treating machine, the combination with a support, of a conveyer operatively mounted on said support for carrying the plant fibers to be treated, means provided along the path of movement of said conveyer for treating the plant fibers while being carried by said conveyer, a movable bed on said support traveling adjacent to said conveyer and in the same direction as said conveyer, and pressing means for pressing the plant fibers being treated against said movable bed to assist the movable bed in regulating the tension in the plant fibers while being treated.

15. In a plant fiber treating machine, the combination with a support, of a conveyer operatively mounted on said support for carrying the plant fibers to be treated, means provided along the path of movement of said conveyer for treating the plant fibers while being carried by said conveyer, a movable bed on said support traveling adjacent to said conveyer and in the same direction as said conveyer, pressing means for pressing the plant fibers being treated against said movable bed by means of which the tension on the plant fibers is regulated, and adjusting means for regulating the speed of said movable bed thereby to assist the movable bed and pressing means to regulate the tension on said plant fibers.

16. In a plant fiber treating machine, the combination with a support, of a conveyer operatively mounted on said support for carrying the plant fibers to be treated, means provided along the path of movement of said conveyer for treating the plant fibers while being carried by said conveyer, a movable bed on said support traveling adjacent to said conveyer and in the same direction as said conveyer, and pressing rolls for pressing the plant fibers being treated against said movable bed to assist the movable bed in regulating the tension in the plant fibers while being treated.

17. In a plant fiber treating machine, the combination with a support, of a conveyer operatively mounted on said support for carrying the plant fibers to be treated, means provided along the path of movement of said conveyer for treating the plant fibers while being carried by said conveyer, a movable bed on said support traveling adjacent to said conveyer and in the same direction as said conveyer, and pressing rolls provided along the path of movement of said conveyer and positioned before and after said treating means for pressing the plant fibers being treated against said movable bed to assist the movable bed in regulating the tension in the plant fibers while being treated by said treating means.

18. In a plant fiber treating machine, the combination with a support, of a conveyer operatively mounted on said support for carrying the plant fibers to be treated, means provided along the path of movement of said conveyer for treating the plant fibers while being carried by said conveyer, a movable bed on said support traveling adjacent to said conveyer and in the same direction as said conveyer, and pressing rolls for pressing the plant fibers being treated against said movable bed to assist the movable bed in regulating the tension in the plant fibers while being treated by said treating means, said pressing rolls being disposed directly before and directly after certain of the treating means to assist in guiding the plant fibers while passing said treating means.

19. In a plant fiber treating machine, the combination with a support, of a conveyer operatively mounted on said support for carrying the plant fibers to be treated, fiber holding means to which the plant fibers are attached, means on said conveyer to which said fiber holding means may be secured whereby the plant fibers are attached to the conveyer, means provided along the path of movement of said conveyer for treating the plant fibers while being carried by said conveyer, and a movable bed on said support traveling adjacent to said conveyer in the same direction as said conveyer, and serving as a bed for the plant fibers.

20. In a plant fiber treating machine, the combination with a support, of a conveyer operatively mounted on said support for carrying the plant fibers to be treated, fiber holding means on said conveyer to which the plant fibers are attached, means provided along the path of movement of said conveyer for treating the plant fibers while being carried by said conveyer, and a movable bed on said support traveling adjacent to said conveyer and in the same direction as said conveyer and serving as a bed for the plant fibers.

21. In a plant fiber treating machine, the combination with a support, of a conveyer operatively mounted on said support for carrying the plant fibers to be treated; means provided along the path of movement of said conveyer for treating the plant fibers while being carried by said conveyer; fiber holding means on said conveyer to which the plant fibers are attached, a movable bed on which the fibers travel between successive fiber treating means, fixed beds adjacent to said fiber treating means coöperating therewith to treat the fibers, and mechanism opening means on said fiber holding means to open said treating means whenever said fiber holding means pass such treating means.

22. In a plant fiber treating machine, the combination with a support, of a conveyer operatively mounted on said support for carrying the plant fibers to be treated, means provided along the path of movement of said conveyer for treating the plant fibers while being carried by said conveyer, fiber holding means on said conveyer to which the plant fibers are attached, a movable bed on which the fibers travel between successive fiber treating means, fixed beds adjacent to said fiber treating means coöperating therewith to treat the fibers, and mechanism opening means to open said treating means whenever said fiber holding means pass such treating means.

23. In a plant fiber treating machine, the combination with a support, of a conveyer operatively mounted on said support for carrying the plant fibers to be treated, means provided above the path of movement of said conveyer for treating the plant fibers while being carried by said conveyer, means provided below the path of movement of said conveyer for treating the plant fibers while being carried by said conveyer, and an interrupted movable bed traveling adjacent to said conveyer and in the same direction as said conveyer and serving as a bed for the plant fibers being treated by the treating means disposed above said conveyer, said movable bed being interrupted above the treating means disposed below said conveyer.

24. In a plant fiber treating machine, the combination with a support, of a conveyer operatively mounted on said support for carrying the plant fibers to be treated, treating means provided above said conveyer for treating the plant fibers being carried by said conveyer, means provided below said conveyer for treating the plant fibers being carried by said conveyer, debris receiving means mounted in said support under the treating means disposed below said conveyer for receiving the debris being removed from the plant fibers in their treatment, and an interrupted movable bed traveling adjacent to said conveyer and in the same direction as said conveyer and serving as a bed for the plant fibers, said movable bed being interrupted above said debris receiving means to allow the aforementioned debris to drop onto said debris receiving means.

25. In a plant fiber treating machine, the combination with a support, of a conveyer operatively mounted on said support for carrying the plant fibers to be treated, means provided along the path of movement of said conveyer for treating the plant fibers while being carried by said conveyer, cleaning means for the treating means disposed adjacent to said treating means, an interrupted movable bed traveling adjacent to said conveyer and in the same direction as said conveyer and serving as a bed for the plant fibers, debris receiving means mounted in said support along said conveyer for receiving the debris to be removed from the plant fibers in their treatment, said movable bed being interrupted above said debris receiving means to allow the aforementioned debris to drop onto said debris receiving means, and chutes extending from said cleaning means to said debris receiving means to conduct the debris removed by said cleaning means into said debris receiving means.

26. In a plant fiber treating machine, the combination with a support, of a conveyer operatively mounted on said support for carrying the plant fibers to be treated, treating means provided above the path of movement of said conveyer for treating the plant fibers while being carried by said conveyer, treating means provided below the path of movement of said conveyer for treating the plant fibers while being carried by said conveyer, debris receiving means mounted in said support under the treating means disposed below said conveyer for receiving the debris removed from the plant fibers in their treatment, an interrupted movable bed traveling adjacent to said conveyer and in the same direction as said conveyer and serving as a bed for the plant fibers, said movable bed being diverted from said conveyer to pass under said debris receiving means, and thus permit the debris to drop from the plant fibers into said debris receiving means, cleaning means for said treating means, and chutes extending from said cleaning means to said debris receiving means to conduct the debris removed by said cleaning means into said debris receiving means.

27. In a plant fiber treating machine, the combination with a support, of a conveyer operatively mounted on said support for carrying the plant fibers to be treated, treating means provided above the path of movement of said conveyer for treating the plant fibers while being carried by said conveyer, treating means provided below the path of movement of said conveyer for treating the plant fibers while being carried by said conveyer, debris receiving means mounted in said support under the treating means disposed below said conveyer for receiving the debris removed from the plant fibers in their treatment, an interrupted movable bed traveling adjacent to said conveyer and in the same direction as said conveyer and serving as a bed for the plant fibers, said movable bed being diverted from said conveyer to pass under said debris receiving means, and thus permit the debris to drop from the plant fibers into said debris receiving means, cleaning means for said treating means, chutes extending from said cleaning means to said debris receiving means, and feeding means in said chutes for conducting the debris removed by said cleaning means into said debris receiving means.

28. In a plant fiber treating machine, the combination with a support, of a continuous conveyer operatively mounted on said support for carrying the plant fibers to be treated, an upper portion in said support through which said conveyer passes, a plurality of stations in said upper portion along the path of movement of said conveyer, means provided at such stations for treating the plant fibers while being carried by such conveyer, a downwardly inclined portion in said support at the end of the upper portion of said support through which inclined portion the conveyer also passes, and a discharge end at the end of said downwardly inclined portion from which the plant fibers being treated are discharged, there being no fiber treating stations in the upper portion of said support for a distance forwardly of the beginning of the inclined portion which distance is substantially equal to the length of the average fibers so that the fibers when turning into the incline will have free movement.

29. In a plant fiber treating machine, the combination with a support, of a conveyer operatively mounted on said support for carrying the plant fibers to be treated, treating means in said support along the path of movement of said conveyer, guiding means along said conveyer, fiber holding means to which the plant fibers are attached, means on said conveyer to which said fiber holding means may be secured, said fiber holding means engaging said guiding means to be guided thereby, and a movable bed on said support traveling adjacent to said conveyer and serving as a bed for the plant fibers.

30. In a plant fiber treating machine, the combination with a support, of a conveyer operatively mounted on said support for carrying the plant fibers to be treated, treating means in said support along the path of movement of said conveyer, guiding means in said conveyer, fiber holding means to which the plant fibers are attached, means on said conveyer to which said fiber holding means may be secured, said fiber holding means engaging said guiding means to be guided thereby, and an interrupted movable bed on said support traveling adjacent to said conveyer and forming a bed for the fibers being treated, and debris receiving means below said conveyer to receive the debris removed from said fibers in their treatment, said movable bed being interrupted above such debris receiving means to allow the debris to drop onto said debris receiving means, said guiding means assisting to support the fiber holding means when traversing over said debris receiving means.

31. In a plant fiber treating machine, the combination with a support, of a conveyer operatively mounted on said support for carrying the plant fibers to be treated, treating means in said support along the path of movement of said conveyer, guiding rails in said support on both sides of the path of movement of said conveyer, fiber holding means to which the plant fibers are attached, means on said conveyer to which said fiber holding means may be secured, said fiber holding means engaging said rails to be guided thereby, an interrupted movable bed traversing adjacent to said conveyer and forming a bed for the fibers being treated, and debris receiving means below said conveyer to receive the debris removed from said fibers in their treatment, said movable bed being interrupted above such debris receiving means to allow debris to drop onto said debris receiving means, said guiding rails assisting to support the fiber holding means when traversing said debris receiving means.

32. In a plant fiber treating machine, the combination with a support, of a conveyer operatively mounted on said support for carrying the plant fibers to be treated, means provided along the path of movement of said conveyer for treating the fibers while being carried by said conveyer, a movable bed traveling adjacent to said conveyer to form a bed for the fibers, and stationary beds disposed along the path of movement of said conveyer opposite to said fiber treating means and above said movable bed.

33. In a plant fiber treating machine, the combination with a support, of a conveyer operatively mounted on said support for carrying the plant fibers to be treated, means provided along the path of movement of said conveyer for treating the fibers while being carried by said conveyer, a movable bed traveling adjacent to said conveyer to form a bed for the fibers, and stationary beds disposed in the path of movement of said conveyer above said movable bed, said stationary beds being disposed opposite to said fiber treating means and coacting with said fiber treating means in the treatment of the fibers which pass between such stationary beds and said fiber treating means.

34. In a plant fiber treating machine, the combination with a support, of a conveyer operatively mounted on said support for carrying the plant fibers to be treated, treating means in said support along the path of movement of said conveyer for treating the fibers while being carried by said conveyer, guiding means along said conveyer, to which the plant fiber holding means are attached, means on said conveyer to which said fiber holding means may be secured, said fiber holding means engaging said guiding means to be guided thereby, a movable bed traveling adjacent to said conveyer to form a bed for the fibers, stationary beds disposed along the path of movement of said conveyer above said movable bed, said stationary beds being disposed opposite to said fiber treating means and coacting with said fiber treating means in the treatment of the fibers which pass between such stationary beds and said fiber treating means, said guiding means being diverted above said stationary beds to permit said fiber holding means and the thereto connected fibers to be guided over said stationary beds.

35. In a plant fiber treating machine, the combination with a support, of a conveyer operatively mounted on said support for carrying the plant fibers to be treated, treating means in said support along the path of movement of said conveyer for treating the fibers while being carried by said conveyer, guiding rails along said conveyer, fiber holding means to which the plant fibers are attached, means on said conveyer to which said fiber holding means may be secured, said fiber holding means engaging said guiding rails to be guided thereby, a movable bed traveling adjacent to said conveyer to form a bed for the fibers, stationary beds disposed along the path of movement of said conveyer above said movable bed, said stationary beds being disposed opposite to said fiber treating means and coacting with said fiber treating means in the treatment of the fibers which pass between such stationary beds and said fiber treating means, said guiding rails extending above said stationary beds to guide said fiber holding means and the thereto connected fibers over said stationary beds.

36. In a plant fiber treating machine, the combination with a support, of a conveyer operatively mounted on said support for carrying the plant fibers to be treated, means provided along the path of movement of said conveyer for treating the fibers while being carried by said conveyer, a movable bed traveling adjacent to said conveyer to form a bed for the fibers, stationary beds disposed along the path of movement of said conveyer between said movable bed and said conveyer and opposite to said treating means, and blades on said stationary beds for both guiding the fibers and separating them from one another.

37. In a plant fiber treating machine, the combination with a support, of a conveyer operatively mounted on said support for carrying the plant fibers to be treated, treating means in said support along the path of movement of said conveyer for treating the fibers while being carried by said conveyer, guiding rails along said conveyer, fiber holding means to which the plant fibers are attached, means on said conveyer to which said fiber holding means may be secured, said fiber holding means engaging said guiding means to be guided thereby, a movable bed traveling adjacent to said conveyer to form a bed for the fibers, stationary beds disposed along the path of movement of said conveyer above said movable bed, said stationary beds being disposed opposite to said fiber treating means between said movable bed and said conveyer, said guiding rails extending above said stationary beds to guide said fiber holding means and the thereto connected fibers over said stationary beds, and blades on said stationary beds for both guiding the fibers and separating them from one another while being treated by the treating means.

38. In a plant fiber treating machine, the combination with a support, of a conveyer operatively mounted on said support for carrying the plant fibers to be treated, an upper portion in said support through which said conveyer passes, a plurality of stations in said upper portion along the path of movement of said conveyer, means provided at such stations for treating the plant fibers while being carried by said conveyer, an upwardly inclined portion in said support connected with the front end of said upper portion through which inclined portion said conveyer passes before passing through said upper portion, the fibers while passing up said upwardly inclined portion due to gravity, arranging themselves in position for treatment in said upper portion of the support, and preliminary treating means disposed in said upwardly inclined portion for preparing the fibers for treatment in said upper portion of the support.

39. In a plant fiber treating machine, the combination with a support, of a conveyer operatively mounted on said support for carrying the plant fibers to be treated, brushes provided along the path of movement of said conveyer for treating the plant fibers while being carried by said conveyer, and a movable bed on said support traveling adjacent to said conveyer and in the same direction as said conveyer and serving as a bed for the plant fibers.

40. In a plant fiber treating machine, the combination with a support, of a conveyer operatively mounted on said support for carrying the plant fibers to be treated, rotary brushes provided along the path of movement of said conveyer for treating the plant fibers while being carried by said conveyer, cleaning means for removing the debris collected on said brushes, said cleaning means being disposed adjacent to said brushes, an interrupted movable bed traveling adjacent to said conveyer and in the same direction as said conveyer and serving as a bed for the plant fibers, debris receiving means mounted in said support along said conveyer for receiving the debris to be removed from the plant fibers in their treatment, said movable bed being interrupted above said debris receiving means to allow the aforementioned debris to drop onto said debris receiving means, and chutes extending from said cleaning means to said debris receiving means to conduct the debris removed by said cleaning means onto said debris receiving means.

41. In a plant fiber treating machine, the combination with a support, of a conveyer operatively mounted on said support for carrying the plant fibers to be treated, treating means provided along the path of movement of said conveyer for treating the plant fibers while being carried by said conveyer, debris receiving means mounted in said support under said conveyer for receiving the debris removed from the plant fibers in their treatment, an interrupted movable bed traveling adjacent to said conveyer and serving as a bed for the plant fibers, said movable bed being diverted from said conveyer to pass under said debris receiving means and thus permit the debris to drop from the plant fibers onto said debris receiving means, cleaning means for said treating means, chutes extending from said cleaning means to said debris receiving means, and feeding means in said chutes for conducting the debris removed by said cleaning means onto said debris receiving means.

42. In a plant fiber treating machine, the combination with a support, of a conveyer operatively mounted on said support for carrying the plant fibers to be treated, rotary brushes provided along the path of movement of said conveyer for treating the plant fibers while being carried by said conveyer, means for driving said rotary brushes, rotary cleaning means for removing the debris from said rotary brushes, combs for removing the debris from said rotary cleaning means, debris receiving means mounted in said support under the conveyer for receiving the debris removed from the fibers in their treatment, an interrupted movable bed traveling adjacent to said conveyer and serving as a bed for the plant fibers, said movable bed being interrupted above said debris receiving means to permit the aforementioned debris to drop onto said debris receiving means, troughs disposed under said combs to receive the debris removed by said combs, chutes extending from said trough to said debris receiving means, and feeding means in said troughs for passing the debris removed by said combs into said said chutes from which they pass into the debris receiving means.

43. In a plant fiber treating machine, the combination with a support, of a continuous conveyer operatively mounted on said support for carrying the plant fibers to be treated, a plurality of stations along the path of movement of said conveyer, rotary brushes at such stations for treating the plant fibers while being carried by said conveyer, and cleaning means for cleaning said rotary brushes, said cleaning means comprising rotary brushing means disposed adjacent to said rotary brushes at the forward portion of the support for removing the pulpy moist debris removed by said brushes at the beginning of the treatment, and rotary blade means disposed adjacent to the rotary brushes at the rearward portion of the support for removing the more dried fibrous debris removed by said brushes in the latter stages of the treatment.

44. In a plant fiber treating machine, the combination with a support, of a continuous conveyer operatively mounted on said support for carrying the plant fibers to be treated, a plurality of stations along the path of movement of said conveyer, rotary brushes at such stations for treating the plant fibers while being carried by said conveyer, cleaning means for cleaning said rotary brushes, said cleaning means comprising rotary brushing means disposed adjacent to said rotary brushes at the forward portion of the support for removing the pulpy moist debris removed by said brushes at the beginning of the treatment, and rotary blade means disposed adjacent to the rotary brushes at the rearward portion of the support for removing the more dried fibrous debris removed by said brushes in the latter stages of the treatment, stationary combs disposed adjacent to said cleaning means to remove the debris collected on such cleaning means, troughs disposed below said combs, and feeding means in said troughs to discharge therefrom the debris received in said troughs.

45. In a plant fiber treating machine, the combination with a support of a conveyer operatively mounted on said support for carrying the plant fibers to be treated, rotary brushes provided along the path of movement of said conveyer for treating the fibers while being carried by said conveyer, a movable bed traveling adjacent to said conveyer to form a bed for the fibers, stationary beds disposed along the path of movement of said conveyer opposite to said rotary brushes and above said movable bed, and blades on said stationary beds for guiding the fibers and separating them from one another, and also for guiding the tufts of the brushes.

46. In a plant fiber treating machine, the combination with a support, of a conveyer operatively mounted on said support for carrying the plant fibers to be treated, rotary brushes provided along the path of movement of said conveyer for treating the fibers while being carried by said conveyer, a movable bed traveling adjacent to said conveyer to form a bed for the fibers, stationary beds disposed along the path of movement of said conveyer opposite to said rotary brushes and between said movable bed and conveyer, and parallel blades on said stationary beds extending in the direction of the path of travel of said conveyer and positioned for guiding the fibers and separating them from one another, and also for guiding the tufts of the brushes.

47. In a plant fiber treating machine, the combination with a support, of a conveyer operatively mounted on said support for carrying the plant fibers to be treated, rotary brushes provided along the path of movement of said conveyer for treating the fibers while being carried by said conveyer, a movable bed traveling adjacent to said conveyer to form a bed for the fibers, stationary beds disposed along the path of movement of said conveyer opposite to said rotary brushes and between said movable bed and conveyer, and parallel blades on said stationary beds extending in the direction of the path of travel of said conveyer and positioned for guiding the fibers and separating them from one another, and also for guiding the tufts of the brushes, the fiber ends of said blades being raised and formed into knife edges to positively separate the fibers from one another when passing onto said stationary beds.

48. In a plant fiber treating machine, the combination with a support, of a conveyer operatively mounted on said support for carrying the plant fibers to be treated, rotary brushes disposed along the path of movement of said conveyer for treating the fibers carried by said conveyer, a movable bed on said support traveling adjacent to said conveyer and in the same direction as said conveyer, pressing rolls for pressing the plant fibers being treated against said movable bed to assist the movable bed in regulating the tension in the plant fibers while being treated, said pressing rolls being disposed directly before and directly after said rotary brushes to assist in guiding the plant fibers while being treated by said rotary brushes, fiber holding means to which the plant fibers are attached, means on said conveyer to which said fiber holding means may be secured whereby the plant fibers are attached to the conveyer, and mechanism openers for raising said rotary brushes and pressing rolls in order to permit said fiber holding means to pass thereunder.

49. In a plant fiber treating machine, the combination with a support, of conveyer-chains operatively mounted on said support for carrying the plant fibers to be treated, rotary brushes disposed along the path of movement of said conveyer-chains for treating the fibers carried by said conveyer-chains, a continuous belt on said support traveling adjacent to said conveyer-chains and in the same direction as said conveyer-chains, pressing rolls for pressing the plant fibers being treated against said belt to assist the belt in regulating the tension in the plant fibers while being treated, said pressing rolls being disposed directly before and directly after said rotary brushes to assist in guiding the plant fibers while being treated by said rotary brushes, fiber holding means to which the plant fibers are attached, projections on the lower ends of said fiber holding means to engage links of said conveyer-chains whereby the plant fibers are attached to travel with the conveyer-chains, and mechanism openers for raising said rotary brushes and pressing rolls in order to permit said fiber holding means to pass thereunder.

50. In a plant fiber treating machine, the combination with a support, of a conveyer operatively mounted on said support for carrying the plant fibers to be treated, brush brackets in said support disposed transversely of said conveyer, rotary brushes mounted in said brush brackets adjacent to the path of movement of said conveyer for treating the fibers, pressing roll brackets in said support disposed transversely of said conveyer, pressing rolls mounted in said roll brackets adjacent to the path of movement of said conveyer for engaging the fibers being carried by said conveyer, fiber holding means on said conveyer to which the plant fibers are attached, and mechanism openers for raising said brush brackets and roll brackets to permit said fiber holding means to pass thereunder.

51. In a plant fiber treating machine, the combination with a support, of a conveyer operatively mounted on said support for carrying the plant fibers to be treated, brush brackets in said support disposed transversely of said conveyer, rotary brushes mounted in said brush brackets adjacent to the path of movement of said conveyer for treating the fibers, pressing roll brackets in said support disposed transversely of said conveyer, pressing rolls mounted in said roll brackets adjacent to the path of movement of said conveyer for engaging the fibers being carried by said conveyer, fiber holding means to which the plant fibers are attached, means on said conveyer to which said fiber holding means may be secured whereby the plant fibers are attached to the conveyer, lifters on said fiber holding means, and rolls on the ends of said brush brackets and pressing roll brackets to be engaged and raised by said lifters when said fiber holding means pass under said brush brackets and pressing roll brackets.

52. In a plant fiber treating machine, the combination with a support, of a conveyer operatively mounted on said support for carrying the plant fibers to be treated, brush brackets in said support disposed transversely of said conveyer, rotary brushes mounted in said brush brackets adjacent to the path of movement of said conveyer for treating the fibers, pressing roll brackets in said support disposed transversely of said conveyer, pressing rolls mounted in said roll brackets adjacent to the path of movement of said conveyer for engaging the fibers being carried by said conveyer, fiber holding means to which the plant fibers are attached, means on said conveyer to which said fiber holding means may be secured whereby the plant fibers are attached to the conveyer, guiding rails in said support on both sides of the path of movement of said conveyer, rolls connected to said fiber holding means traveling in said rails, whereby said fiber holding means are guided, and brush beds disposed along the path of movement of said conveyer opposite to said brushes, said guiding rails bending above said brush beds to guide said fiber holding means and the thereto connected fibers over said brush beds.

53. In a plant fiber treating machine, the combination with a support, of a conveyer operatively mounted on said support for carrying the plant fibers to be treated, fiber treating means in said support disposed transversely of, and along the path of movement of said conveyer, fiber holding means to which the plant fibers are attached, means on said conveyer to which said fiber holding means may be secured whereby the plant fibers are attached to the conveyer, lifters on said fiber holding means, a movable bed on which the fibers travel between successive fiber treating means, fixed beds adjacent to said fiber treating means and coöperating therewith to treat the fibers, and rolls on the ends of said fiber treating means to be engaged and raised by said lifters when said fiber holding means pass under said fiber treating means.

54. In a plant fiber treating machine, the combination with a support, of a chain-conveyer operatively mounted on said support for carrying the plant fibers to be treated, fiber treating means in said support disposed transversely of, and along the path of movement of said conveyer, fiber holding means to which the plant fibers are attached, projections on the lower side of said fiber holding means to engage said chain-conveyer whereby the plant fibers are attached to the conveyer, lifters on said fiber holding means, a movable bed on which the fibers travel between successive fiber treating means, fixed beds adjacent to said fiber treating means coöperating therewith to treat the fibers, and rolls on the ends of said fiber treating means to be engaged and raised by said lifters when said fiber holding means pass under said fiber treating means.

55. In a plant fiber treating machine, the combination with a support, of a chain-conveyer operatively mounted on said support for carrying the plant fibers to be treated, fiber treating means in said support disposed transversely of, and along the path of movement of said conveyer, fiber holding means to which the plant fibers are attached, projections on the lower sides of said fiber holding means to engage said chain-conveyer whereby the plant fibers are attached to the conveyer, lifters on said fiber holding means embracing plates having a medially disposed upwardly bulging portion to form a cam surface, a movable bed on which the fibers travel between successive fiber treating means, fixed beds adjacent to said fiber treating means coöperating therewith to treat the fibers, and rolls on the ends of said fiber treating means to be engaged and raised by the cam surfaces of said lifter plates when said fiber holding means pass under said fiber treating means.

56. In a plant fiber treating machine, the combination with a support, of a conveyer operatively mounted on said support for carrying the plant fibers to be treated, means provided along the path of movement of said conveyer for treating the plant fibers while being carried by said conveyer, a movable bed on said support traveling adjacent to said conveyer and in the same direction as said conveyer and serving as a bed for the plant fibers, means for driving said movable bed, and multi-speed mechanism for varying the speed of said driving means to regulate the speed of said movable bed to assist said movable bed in regulating the tension of the plant fibers while being treated.

57. In a plant fiber treating machine, the combination with a support, of a conveyer operatively mounted on said support for carrying the plant fibers to be treated, means provided along the path of movement of said conveyer, driving means for driving said conveyer, a movable bed on said support for traveling adjacent to said conveyer and serving as a bed for the plant fibers, and multi-speed driving means for driving said movable bed so as to produce either a drag of various degrees on said fibers or even to crowd up said fibers at a faster speed than said conveyer is traveling in certain cases.

58. In a plant fiber treating machine, the combination with a support, of a conveyer operatively mounted on said support for carrying the plant fibers to be treated, treating means in said support along the path of movement of said conveyer, guiding rails in said support on both sides of the path of movement of said conveyer, fiber holding means to which the plant fibers are attached, means on said conveyer to which said fiber holding means may be secured, rolls on said fiber holding means to engage said rails to thereby guide said fiber holding means, and a movable bed on which the fibers travel when being carried by said conveyer.

59. The combination with a plant carrying conveyer, of a fiber-treating apparatus comprising a fixed plant-stranding brush-bed and a brush in position and arranged for brushing the plant-strands while these are being drawn over said brush-bed by the conveyer.

60. The combination with a plant-carrying conveyer, of a fiber-treating apparatus comprising a fixed plant-stranding brush-bed and a revolving brush in position and arranged for brushing the plant-strands while these are being drawn over said brush-bed by the conveyer.

61. In a plant fiber treating machine, the combination with a support, of a continuous conveyer operatively mounted on said support for carrying the plant fibers to be treated, a plurality of stations along the path of movement of said conveyer, means provided at certain of said stations for treating the plant fibers with a certain intensity, and means provided at the other of said stations for treating the plant fibers with a different intensity.

62. In a plant fiber treating machine, the combination with a support, of a continuous conveyer operatively mounted on said support for carrying the plant fibers to be treated, a plurality of stations along the path of movement of said conveyer, means provided at such stations for treating the plant fibers while being carried by said conveyer, and means for regulating the intensity of the treating means so that the several stations may treat the fibers with various intensities.

63. In a plant fiber treating machine, the combination with a support, of a conveyer operatively mounted on said support for carrying the plant fibers to be treated, means provided along the path of movement of said conveyer to transmit various treatments to said fibers, said treating means including an interrupted movable bed forming a bed for the fibers at intervals and traveling in the direction of the conveyer, a stationary bed to supplant the movable bed where interrupted, presser-rolls above said beds for pressing said fibers against said beds, said treating means being disposed to treat said fibers when they pass over said stationary beds so that they will also be subjected to a dragging treatment by rubbing along the stationary bed.

64. In a plant fiber treating machine, the combination with a support, of a conveyer operatively mounted on said support for carrying the plant fibers to be treated, comprising a linked chain fiber holding means to which the plant fibers are attached, the links of the chain conveyer affording means all along said conveyer to which said fiber holding means may be secured so that the fiber holding means may be attached to the conveyer directly at the end of the bank of fibers preceding it and thus prevent loss of space, and means provided along the path of movement of said conveyer for treating the plant fibers while being carried by said conveyer.

CYRUS F. LOGAN.

Witnesses:
GUSTAV DREWS,
D. D. PENNEY.